United States Patent
Sia et al.

(10) Patent No.: US 12,541,964 B2
(45) Date of Patent: Feb. 3, 2026

(54) ADAPTABLE AUTOMATED INTERPRETATION OF RAPID DIAGNOSTIC TESTS USING SELF-SUPERVISED LEARNING AND FEW-SHOT LEARNING

(71) Applicant: The Trustees of Columbia University in the City of New York, New York, NY (US)

(72) Inventors: Samuel K. Sia, New York, NY (US); Shih-Fu Chang, New York, NY (US); Siddarth Arumugam, New York, NY (US); Uzay Macar, New York, NY (US); Jiawei Ma, New York, NY (US); Guangxing Han, New York, NY (US); David Colburn, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 288 days.

(21) Appl. No.: 18/125,341

(22) Filed: Mar. 23, 2023

(65) Prior Publication Data

US 2023/0274538 A1 Aug. 31, 2023

Related U.S. Application Data

(63) Continuation of application No. PCT/US2021/053708, filed on Oct. 6, 2021.
(Continued)

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
None
See application file for complete search history.

(56) References Cited

U.S. PATENT DOCUMENTS 7,421,125 B1 9/2008 Rees
10,340,032 B2 7/2019 Ramsey et al.
(Continued)

FOREIGN PATENT DOCUMENTS

CN 111260677 A 6/2020
CN 111353548 A 6/2020
(Continued)

OTHER PUBLICATIONS

Li et al., "Few-Shot Image Classification via Contrastive Self-Supervised Learning," arXiv:2008.09942v1 [cs.CV] Aug. 23, 2020 (Year: 2020).*

(Continued)

*Primary Examiner* — Soo Shin
(74) *Attorney, Agent, or Firm* — Potomac Law Group, PLLC

(57) ABSTRACT

A framework for a few-shot learning method is disclosed. In a first part, self-supervision and classification supervision are used to train a feature extractor. An example self-supervision method comprises running grayscale images through an edge filter, normalizing the filtered images, setting the normalized images to ground truth, generating feature-extracted images, using a decoder to reconstruct images from the feature-extracted images, determining a loss between the reconstructed images and the ground truth images, and using the loss to update parameters of the feature extractor. In a second part, a few-shot adaptation process is performed to adapt the model to a novel rapid test kit.

13 Claims, 17 Drawing Sheets

Related U.S. Application Data

(60) Provisional application No. 63/208,852, filed on Jun. 9, 2021, provisional application No. 63/089,675, filed on Oct. 9, 2020.

(56) References Cited

U.S. PATENT DOCUMENTS

| | | | | |
|---|---|---|---|---|
| 11,783,563 | B2* | 10/2023 | Yaghoubi | G06T 7/168 382/128 |
| 2015/0055134 | A1* | 2/2015 | Papautsky | G01N 21/278 356/402 |
| 2015/0111201 | A1* | 4/2015 | Ozcan | G01N 21/645 435/5 |
| 2016/0080548 | A1* | 3/2016 | Erickson | G01N 21/80 382/128 |
| 2016/0274104 | A1* | 9/2016 | Aminoff | G01N 21/8483 |
| 2016/0373647 | A1 | 12/2016 | Morate et al. | |
| 2018/0293350 | A1* | 10/2018 | Dimov | G16H 50/20 |
| 2019/0080453 | A1 | 3/2019 | Song et al. | |
| 2019/0252073 | A1* | 8/2019 | Hsu | G06T 7/0012 |
| 2020/0019823 | A1 | 1/2020 | Wang | |
| 2020/0051241 | A1 | 2/2020 | Clark et al. | |
| 2020/0085382 | A1 | 3/2020 | Taerum et al. | |
| 2020/0210767 | A1 | 7/2020 | Do et al. | |
| 2020/0226462 | A1 | 7/2020 | Maddison et al. | |
| 2020/0234025 | A1 | 7/2020 | Cohen et al. | |
| 2020/0278297 | A1 | 9/2020 | Karlovac et al. | |
| 2020/0311914 | A1 | 10/2020 | Zaharchuk et al. | |
| 2021/0287766 | A1* | 9/2021 | Juhila | G16H 30/40 |

FOREIGN PATENT DOCUMENTS

| | | | | |
|---|---|---|---|---|
| WO | WO-9953288 | A2 * | 10/1999 | G01N 33/561 |
| WO | 2019122047 | A1 | 6/2019 | |
| WO | 2020242993 | A1 | 12/2020 | |
| WO | 2021202866 | A1 | 10/2021 | |
| WO | 2022006416 | A1 | 1/2022 | |
| WO | 2022086940 | A1 | 4/2022 | |
| WO | 2022086945 | A1 | 4/2022 | |

OTHER PUBLICATIONS

Yuan et al., "Current and Perspective Diagnostic Techniques for COVID-19," ACS Infect. Dis. 2020, 6, 1998-2016 (Year: 2020).*

Carrio et al., "Automated Low-Cost Smartphone-Based Lateral Flow Saliva Test Reader for Drugs-of-Abuse Detection, " Sensors 2015, 15, 29569-29593; doi:10.3390/s151129569 (Year: 2015).*

Pratondo, et al., "Integrating machine learning with region-based active contour models in medical image segmentation," Journal of Visual Communication and Image Representation, Feb. 2017, vol. 43, pp. 1-9, Elsevier.

Raghu et al., "Rapid Learning or Feature Reuse? Towards Understanding the Effectiveness of MAML," arXiv:1909.09157 [cs.LG], ICLR (2020).

Ren et al., "Faster R-CNN: Towards Real-Time Object Detection with Region Proposal Networks," IEEE Trans Pattern Anal Mach Intell, vol. 39, pp. 1137-1149, 2017.

Ristaino et al., "Detection of Phytophthora infestans by Loop-Mediated Isothermal Amplification, Real-Time LAMP, and Droplet Digital PCR," Plant Disease, pp. 1-9, Nov. 2019.

Ruppert et al., "A smartphone readout system for gold nanoparticle-based lateral flow assays: application to monitoring of digoxigenin," Microchimica Acta, vol. 186, p. 119, Jan. 2019.

Sajid et al., "Designs, formats and applications of lateral flow assay: A literature review," Journal of Saudi Chemical Society, vol. 19, pp. 689-705, 2015.

Shah et al., "Mobile Phone Ratiometric Imaging Enables Highly Sensitive Fluorescence Lateral Flow Immunoassays without External Optical Filters," Anal. Chem., vol. 90, No. 11, pp. 6967-6974, Jun. 2018.

Shaw et al., "Improving Image Classifiers With Supervised Contrastive Learning." Weights & Biases, https://wandb.ai/authors/scl/reports/Improving-Image-Classifiers-With-Supervised-Contrastive-Learning--VmlldzoxMzQwNzE; downloaded Oct. 2021.

Snell, "Prototypical Networks for Few-shot Learning," Advances in Neural Information Processing Systems, pp. 4077-4087, Jun. 2017.

Solmaz et al., "Quantifying colorimetric tests using a smartphone app based on machine learning classifiers," Sensors and Actuators B: Chemical, Feb. 2018, vol. 255, Part 2, pp. 1967-1973, Elsevier.

Sun et al., "Meta-Transfer Learning for Few-Shot Learning," Proceedings of the IEEE conference on computer vision and pattern recognition, pp. 403-412, 2019.

Unknown, "FDA In Vitro Diagnostics EUA's—Antigen Diagnostic Tests for SARS-CoV-2," 2021, https://www.fda.gov/medical-devices/coronavirus-disease-2019-covid-19-emergency-use-authorizations-medical-devices/in-vitro-diagnostics-euas-antigen-diagnostic-tests-sars-cov-2, accessed May 2023.

Unknown, "Rapid Lateral Flow Test Strips: Considerations for Product Development," Millipore, 2013.

Wan et al., "Variational autoencoder based synthetic data generation for imbalanced learning," IEEE Symposium Series on Computational Intelligence (SSCI), pp. 1-7, 2017, Abstract,.

Wang et al., "Generalizing from a Few Examples: A Survey on Few-Shot Learning," ACM Computer Surveys, vol. 1, No. 1, Article 1, pp. 1:1-1:34, Mar. 2020.

Wang et al., "Learning to Learn: Model Regression Networks for Easy Small Sample Learning, " European Conference on Computer Vision, pp. 616-634, 2016.

Wang et al., "Meta-Learning to Detect Rare Objects," Proceedings of the IEEE International Conference on Computer Vision, pp. 9925-9934, 2019.

Whitelaw et al., "Applications of digital technology in COVID-19 pandemic planning and response," Lancet Digital Health, vol. 2, pp. e435-e440, Jun. 2020.

Wood et al., "Taking connected mobile-health diagnostics of infectious diseases to the field," Nature, vol. 566, No. 7745, pp. 467-474, Feb. 2019.

Wu et al., "Towards One Shot Learning by Imitation for Humanoid Robots," Proceedings—IEEE International Conference on Robotics and Automation, pp. 2889-2894, May 2010.

Yetisen et al., "Paper-based microfluidic point-of-care diagnostic devices," Lab on a Chip, vol. 13, pp. 2210-2251, 2013.

Abingdon Health, "Abingdon Health announces £1M Innovate UK funding for the development of a fully quantitative lateral flow Smartphone Reader," 2 pages, Sep. 17, 2020.

Abingdon Health, "New flexible lateral flow Smartphone reader App developed," 2 pages, Dec. 20, 2018.

Abingdon Health, "AppDx" Smartphone Reader brochure, from https://www.abingdonhealth.com/contract-services/lateral-flow-reader/appdx/ (undated).

Andryukov, "Six decades of lateral flow immunoassay: from determining metabolic markers to diagnosing COVID-19," Aims Microbiology, vol. 6, No. 3, pp. 280-304, Aug. 2020.

Aveyard et al., "One step visual detection of PCR products with gold nanoparticles and a nucleic acid lateral flow (NALF) device," Chemical Communications, vol. 41, No. 41, pp. 4251-4253, Dec. 2007.

Bahadir et al., "Lateral flow assays: Principles, designs and labels," TrAC Trends in Analytical Chemistry, vol. 82, pp. 286-306, Sep. 2016.

Balan, et al., "SMARTtest: A Smartphone App to Facilitate HIV and Syphilis Self-and Partner-Testing, Interpretation of Results, and Linkage to Care," AIDS and Behavior, 2019, vol. 24, pp. 1560-1573, https://doi.org/10.1007/s10461-019-02718-y.

Ballard et al., "Deep learning-enabled point-of-care sensing using multiplexed paper-based sensors," NPJ Digital Medicine, vol. 3, No. 66, pp. 1-7, 2020.

Budd et al., "Digital technologies in the public-health response to COVID-19," Nature Medicine, vol. 26, pp. 1183-1192, Aug. 2020.

Butt et al., "Deep learning system to screen coronavirus disease 2019 pneumonia." Applied Intelligence, 2020, pp. 1-7.

(56) References Cited

OTHER PUBLICATIONS

Carrio, et al., "Automated Low-Cost Smartphone-Based Lateral Flow Saliva Test Reader for Drugs-of-Abuse Detection," Sensors (Basel), 2015, vol. 15(11), pp. 29569-29593.

Chhikara, "The inverse Gaussian distribution theory: methodology, and applications," vol. 95, CRC Press, 1988 (Description and Table of Contents).

Colubri et al., "Transforming Clinical Data into Actionable Prognosis Models: Machine-Learning Framework and Field-Deployable App to Predict Outcome of Ebola Patients, " PLOS Neglected Tropical Diseases, 2016, vol. 10(3), pp. 1-17.

Contreras-Naranjo et al., "Mobile Phone Based Microscopy, Sensing, and Diagnostics," IEEE Journal of Selected Topics in Quantum Electronics, vol. 22, pp. 1-14, 2015.

De Bruijne, "Machine learning approaches in medical image analysis: From detection to diagnosis," Medical Image Analysis, Oct. 2016, vol. 33, pp. 94-97, 20th anniversary of the Medical Image Analysis journal (MedIA), Elsevier.

Dell et al., "Mobile tools for point-of-care diagnostics in the developing world," Proceedings of the 3rd ACM Symposium on Computing for Development, Article No. 9, pp. 1-10, Jan. 2013, Abstract.

Dell et al., "Towards a point-of-care diagnostic system: automated analysis of immunoassay test data on a cell phone," NSDR'11 Proceedings of the 5th ACM Workshop on Networked Systems for developing regions, pp. 3-8, Jun. 2011.

Deng et al., "ImageNet: A large-scale hierarchical image database," IEEE Conference on Computer Vision and Pattern Recognition, pp. 248-255, 2009, Abstract.

Draz et al., "Virus detection using nanoparticles and deep neural network-enabled smartphone system," Science Advances, vol. 6, No. 51, p. eabd5354, Dec. 2020.

Finn, et al., "Model-agnostic meta-learning for fast adaptation of deep networks," arXiv preprint arXiv:1703.03400, 2017, (13 pages).

Folks et al., "The Inverse Gaussian Distribution and its Statistical Application: a Review," J.R. Statist. Soc. B, vol. 40, No. 3, pp. 263-289, 1978.

Fuhad et al., "Deep Learning Based Automatic Malaria Parasite Detection from Blood Smear and Its Smartphone Based Application," Diagnostics (Basel), 2020, vol. 10(5), Article 329, pp. 1-22.

Ghani et al., "Expanding the role of diagnostic and prognostic tools for infectious diseases in resource-poor settings," Nature, vol. 528, pp. S50-S52, Dec. 2015.

Girschick, "Fast R-CNN," IEEE International Conference on Computer Vision (ICCV), pp. 1440-1448, 2015.

He et al., "Mask R-CNN," arXiv preprint arXiv:1703.06870, pp. 2961-2969, 2017.

He et al., "Mask R-CNN," arXiv preprint arXiv: 1703.06870v3, pp. 1-12, 2018.

He, et al., "Mask R-CNN," IEEE Transactions on Pattern Analysis and Machine Intelligence, vol. 42, Issue 2, pp. 386-397, Feb. 2020, Abstract.

Huang et al., "Gold nanoparticles: Optical properties and implementations in cancer diagnosis and photothermal therapy," Journal of Advanced Research, vol. 1, Issue 1, pp. 13-28, Jan. 2010.

Ibitoye et al., "Home Testing Past, Present and Future: Lessons Learned and Implications for HIV Home Tests (A Review)," AIDS Behav., vol. 18, No. 5, pp. 933-949, May 2014.

International Search Report and Written Opinion mailed Mar. 1, 2022 for International Patent Application No. PCT/US2021/053708.

Joung et al., "Point-of-Care Serodiagnostic Test for Early-Stage Lyme Disease Using a Multiplexed Paper-Based Immunoassay and Machine Learning," ACS Nano., vol. 14, No. 1, pp. 229-240, Jan. 2020, Abstract.

Kang et al., "Few-shot Object Detection via Feature Reweighting," Proceedings of the IEEE International Conference on Computer Vision, pp. 8420-8429, 2019.

Ker et al., "Deep Learning Applications in Medical Image Analysis," IEEE Access, 2018, vol. 6, pp. 9375-9389.

Khosla et al., "Supervised Contrastive Learning," 34th Conference on Neural Information Processing Systems, 2020.

Kim et al., "Colorimetric analysis of saliva-alcohol test strips by smartphone-based instruments using machine-learning algorithms," Applied Optics, 2017, vol. 56(1), pp. 84-92, OSA Publishing, Abstract.

Kingma et al., "Auto-Encoding Variational Bayes," CoRR, abs/1312.6114, 2013.

Kiran et al., "Automatic Rectification of Perspective Distortion From a Single Image Using Plane Homography," International Journal on Computational Sciences & Applications, vol. 3, No. 5, pp. 47-58, Oct. 2013.

Kittler, "On the accuracy of the Sobel edge detector," Image and Vision Computing, vol. 1, Issue 1, pp. 37-42, Feb. 1983.

Koczula et al., "Lateral flow assays," Essays in Biochemistry, vol. 60, pp. 111-120, Jun. 2016.

Kong et al., "Highly Stable and Sensitive Nucleic Acid Amplification and Cell-Phone-Based Readout," ACS Nano, vol. 11, No. 3, pp. 2934-2943, Feb. 2017, Abstract.

Kose, et al., "Utilizing Machine Learning for Image Quality Assessment for Reflectance Confocal Microscopy," Journal of Investigative Dermatology, Jun. 2020, vol. 140(6), pp. 1214-1222, Elsevier.

Lake et al., "Human-level concept learning through probabilistic program induction," Science, vol. 350, Issue 6266, pp. 1332-1338, Dec. 2015.

McAulay et al., "Retrospective clinical evaluation of 4 lateral flow assays for the detection of SARS-CoV-2 IgG," Diagnostic Microbiology and Infectious Disease, vol. 98, p. 115161, Aug. 2020.

Mei et al., "Artificial intelligence-enabled rapid diagnosis of patients with COVID-19," Natural Medicine, 2020, vol. 26, pp. 1224-1228, Nature.

Minaee et al., "Image Segmentation Using Deep Learning: A Survey," IEEE Transactions on Pattern Analysis and Machine Intelligence, vol. 44, Issue 7, Jul. 2022, Abstract.

Murray et al., "Digital public health and COVID-19," Lancet Public Health, vol. 9, pp. e469-e470, Sep. 2020.

Parolo et al., "Tutorial: design and fabrication of nanoparticle-based lateral-flow immunoassays," Nature Protocols, vol. 15, Suppl. 1, pp. 3788-3816, Oct. 2020.

Pathania, et al., "Point-of-care cervical cancer screening using deep learning-based microholography," Theranostics, 2019, vol. 9(26), pp. 8438-8447, Ivyspring International Publishing.

Posthuma-Trumpie et al., "Lateral flow (immuno) assay: its strengths, weaknesses, opportunities and threats. A literature survey," Anal Bioanal Chem, vol. 393, 569-582 (2009).

Potluri et al., "An inexpensive smartphone-based device for point-of-care ovulation testing," Lab Chip., vol. 19, No. 1, pp. 59-67, Dec. 2018.

\* cited by examiner

ADAPTABLE AUTOMATED INTERPRETATION OF RAPID DIAGNOSTIC TESTS USING SELF-SUPERVISED LEARNING AND FEW-SHOT LEARNING

CROSS-REFERENCE TO RELATED APPLICATIONS

This application is a continuation of International Application No. PCT/US2021/053708, filed Oct. 6, 2021, entitled "Adaptable Automated Interpretation of Rapid Diagnostic Tests Using Self-Supervised Learning and Few-Shot Learning," which claims priority to U.S. Provisional Patent Application No. 63/089,675, filed Oct. 9, 2020, entitled "Rapid Test Kit Model Utilizing Self-Supervised Learning and Meta-Learning," and U.S. Provisional Patent Application No. 63/208,852, filed Jun. 9, 2021, entitled "Adaptable Automated Interpretation of Rapid Diagnostic Tests Using Few-Shot Learning." The entire contents of International Application No. PCT/US2021/053708, U.S. Provisional Patent Application No. 63/089,675, and U.S. Provisional Patent Application No. 63/208,852 are hereby incorporated herein by reference.

FIELD OF THE INVENTION

The invention relates to automated image interpretation of rapid test kits.

BACKGROUND OF THE INVENTION

Traditional automated image interpretation tasks using deep learning models require a large number of training images to build a model of sufficiently high accuracy. The utility of such an approach is limited when it is used to automate the interpretation of rapid test kit images due to the time it would take to acquire the large numbers of images of the various test kits. Additionally, insufficient training images can lead to a model that overfits on the limited training dataset resulting in poor accuracy.

SUMMARY OF THE INVENTION

In some embodiments, a system is provided for automated image interpretation of rapid test kits, wherein the system comprises a neural network; wherein the neural network comprises a feature extractor; wherein the feature extractor has been pre-trained by: inputting a set of images of first rapid test kits; converting the images in the inputted set of images to grayscale images; running the grayscale images through an edge filter, normalizing the filtered images, and setting the normalized images to ground truth; generating feature-extracted images from the images in the inputted set of images; using a decoder to reconstruct images from the feature-extracted images; determining a first calculated loss between the reconstructed images and the ground truth images; and using the first calculated loss to update parameters of the feature extractor.

In some embodiments, in addition to the set of images of first rapid test kits, the feature extractor has also been pre-trained with a synthetic dataset mixed with the set of images of first rapid test kits, wherein the synthetic dataset comprises faint positive and negative zones.

In some embodiments, the system is for automated image interpretation of second rapid test kits that are a different type of test kit than the first rapid test kits.

In some embodiments, the feature extractor also has been pre-trained by: using a classifier to classify the feature-extracted images; determining a second calculated loss between the classified images and labels for the images in the inputted set of images; and using the second calculated loss to update parameters of the feature extractor.

In some embodiments, a system is provided for automated image interpretation of rapid test kits, wherein the system comprises a neural network; wherein the neural network comprises a feature extractor and a classifier; wherein the feature extractor has been pre-trained using self-supervised learning with a set of first rapid test kits; and wherein the neural network has been adapted to a second rapid test kit that is a different type of test kit than the first rapid test kits.

In some embodiments, the neural network has been adapted to the second rapid test kit using a few-shot adaptation process comprising supervised contrastive learning.

In some embodiments, the neural network has been adapted to the second rapid test kit using a few-shot adaptation process comprising a meta-learning technique, wherein the meta-learning comprises: (i) a meta-training step comprising: separating a set of images of the first rapid test kits into a support set and a query set; using the support set of the first rapid test kits to update a classifier; using the query set of the first rapid test kits to calculate a loss on the query set samples; and using the loss to update the initialization of the classifier; and (ii) a meta-testing step comprising training the classifier with the updated initialization values on a set of images of the second rapid test kits to get an updated network adapted to the second rapid test kit, wherein the number of images in the set of images of the second rapid test kits is smaller than the number of images in the set of images of the first rapid test kits.

In some embodiments, the feature extractor has been pre-trained using self-supervised learning for an edge-detection task.

In some embodiments, the number of images in the set of images of the second rapid test kits is at most 20.

In some embodiments, the ratio of the number of images in the set of images of the first rapid test kits to the number of images in the set of images of the second rapid test kits is 5:1 or greater.

In some embodiments, a system is provided for automated image interpretation of rapid test kits, wherein the system comprises software that may be implemented on a user's smart phone, wherein the software uses a gyroscope of the user's smart phone to get a test kit image into a correct orientation.

In some embodiments, the system comprises a deep neural network for instance segmentation to detect kit and membrane boundaries.

In some embodiments, the system is adapted to extract individual zones from each kit using kit dimensions provided by a kit manufacturer.

In some embodiments, the system comprises a neural network including a feature extractor and a classifier, wherein the feature extractor has been pre-trained using self-supervised learning.

In some embodiments, the system comprises a neural network including a feature extractor and a classifier, wherein the classifier has been learned using a few-shot learning technique.

In some embodiments, a method is provided for automated image interpretation of rapid test kits, wherein the method comprises pre-training a feature extractor by: inputting a set of images of first rapid test kits; converting the images in the inputted set of images to grayscale images;

running the grayscale images through an edge filter, normalizing the filtered images, and setting the normalized images to ground truth; generating feature-extracted images from the images in the inputted set of images; using a decoder to reconstruct images from the feature-extracted images; determining a first calculated loss between the reconstructed images and the ground truth images; and using the first calculated loss to update parameters of the feature extractor.

In some embodiments, a method for automated image interpretation of rapid test kits further comprises generating a synthetic dataset comprising faint positive and negative zones, mixing the synthetic dataset with the set of images of first rapid test kits, and using the synthetic dataset mixed with the set of images of first rapid test kits to pre-train the feature extractor.

In some embodiments, the method is for automated image interpretation of second rapid test kits that are a different type of test kit than the first rapid test kits.

In some embodiments a method for automated image interpretation of rapid test kits further comprises pre-training the feature extractor by: using a classifier to classify the feature-extracted images; determining a second calculated loss between the classified images and labels for the images in the inputted set of images; and using the second calculated loss to update parameters of the feature extractor.

In some embodiments, a method is provided for automated image interpretation of rapid test kits, wherein the method comprises: providing a neural network comprising a feature extractor and a classifier; pre-training the feature extractor using self-supervised learning with a set of first rapid test kits; and adapting the neural network to a second rapid test kit that is a different type of test kit than the first rapid test kits.

In some embodiments, the step of adapting the neural network to the second rapid test kit comprises using a few-shot adaptation process comprising supervised contrastive learning.

In some embodiments, the step of adapting the neural network to the second rapid test kit comprises using a few-shot adaptation process comprising a meta-learning technique, wherein the meta-learning technique comprises: (i) a meta-training step comprising:
separating a set of images of first rapid test kits into a support set and a query set; using the support set of the first rapid test kits to update a classifier; using the query set of the first rapid test kits to calculate a loss on the query set samples; and using the loss to update the parameters of the classifier; and (ii) a meta-testing step comprising training the classifier on a set of images of the second rapid test kits to get an updated network adapted to the second rapid test kit, wherein the number of images in the set of images of the second rapid test kits is smaller than the number of images in the set of images of the first rapid test kits.

In some embodiments, the step of pre-training the feature extractor using self-supervised learning comprises pre-training the feature extractor using self-supervised learning for an edge-detection task.

In some embodiments, the number of images in the set of images of the second rapid test kit is at most 20.

In some embodiments, the ratio of the number of images in the set of images of the first rapid test kits to the number of images in the set of images of the second rapid test kits is 5:1 or greater.

In some embodiments, a method is provided for automated image interpretation of rapid test kits, wherein the method uses a gyroscope of a user's smart phone to get a test kit image into a correct orientation.

DETAILED DESCRIPTION

Figure 1:
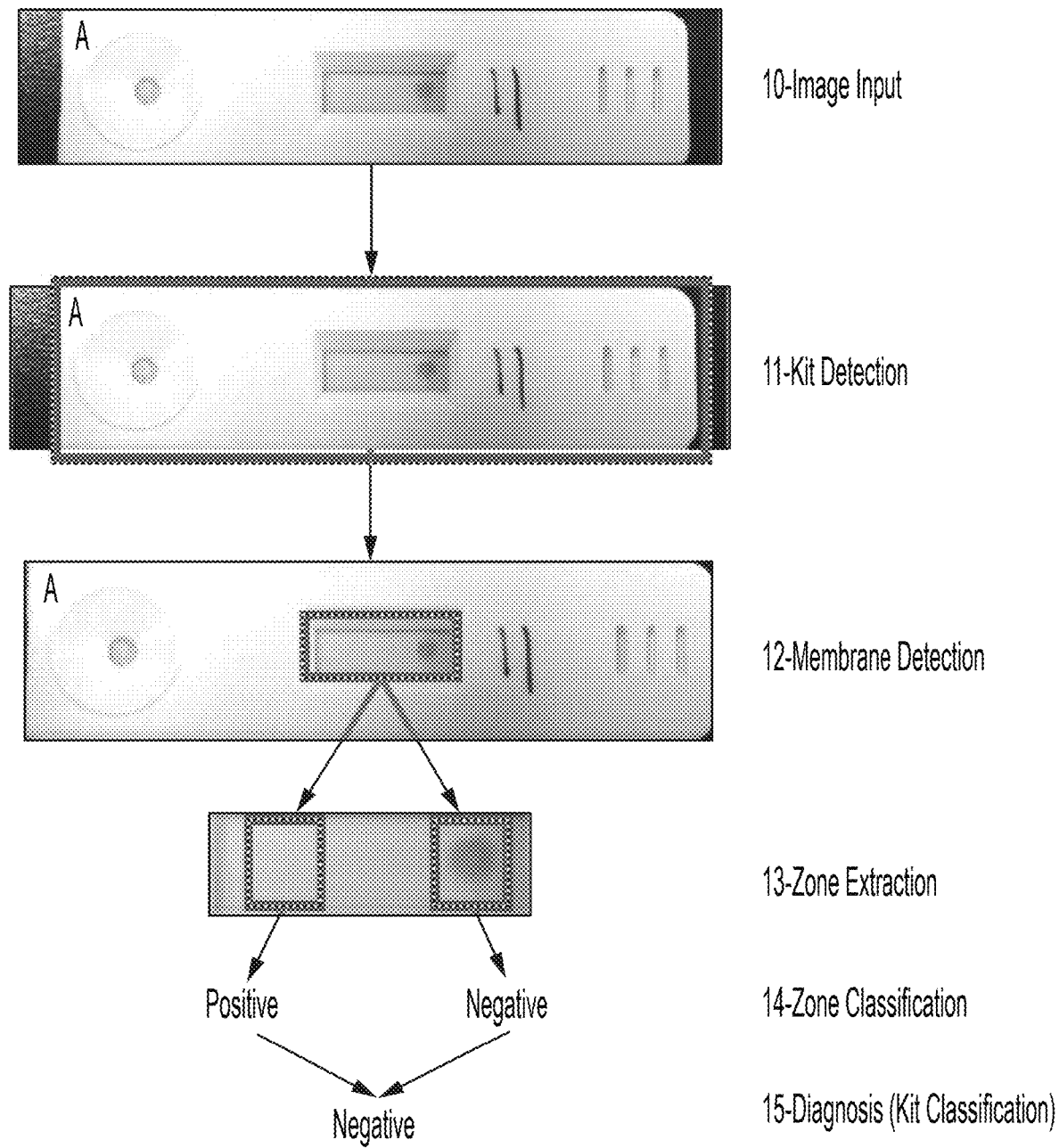
FIG. 1 illustrates an example pipeline in accordance with some embodiments of the disclosure.

Inventions as disclosed herein may be implemented in models for automated image interpretation of rapid test kits. Rapid test kits are used to provide a relatively quick indication of the potential presence of one or more particular conditions or diseases. A sample, for example saliva or blood, is applied to the test kit, and the test kit returns a visible result that can be interpreted to indicate the potential presence of a condition or disease. The rapid test kits are often self-administered, with the patient using the kit at home or another location. As one example, AssureTech EcoTest COVID-19 IgG/IgM Antibody Test is a test for detection of SARS-COV-2 IgM and SARS-COV-2 IgG antibodies in human whole blood, serum or plasma. As another example, OraQuick® (OraSure Technologies, Inc.) is an oral swab test for HIV. In many cases of rapid test kits, the patient interprets the results of the rapid test kit by visually checking a membrane for the presence or absence of a band (line) or dot.

In models according to some embodiments of the inventions as disclosed herein, after self-administering the test, the patient may input an image of the rapid test kit to a system for automated interpretation of the image. The patient may use, for example, a smart phone to take a picture of the rapid test kit and to send that picture for automated interpretation. The system interprets the image to determine a classification, e.g., positive, negative, or invalid, and then returns that interpretation as a result to the patient and/or to a care provider.

In certain embodiments, models according to the invention may address the problem of building a model of sufficient accuracy for a new rapid test kit without having or requiring a large number of training images for the new rapid test kit. In certain embodiments, this issue is addressed by an approach disclosed herein that facilitates the rapid adaptation of a pre-trained model to new test kits using a smaller number of images. This approach saves time and resources that would otherwise be spent in acquiring images for the new rapid test kits. Pairing this model with a smartphone application can help facilitate the rapid development and deployment of kit-specific interpretation models.

In certain embodiments as described herein, the approach may include:
1. A pipeline integrating a deep learning model with a smartphone for image acquisition and processing.
2. A few-shot learning framework as described herein, which framework may also incorporate self-supervised learning. The framework may also make use of a manufacturer-provided kit specification file.

In models according to certain embodiments as disclosed herein, the automated image interpretation pipeline may carry out the following functions, or a subset of these functions:
1. Make sure the rapid test image is in the correct orientation, and/or rotate the image to get it into the correct orientation. This may be done using, for example, the gyroscope of the patient's smart phone.
2. Detect the kit and membrane boundaries using a detection model. The detection model may be based, for example, on a deep neural network for instance segmentation, such as Mask R-CNN (See, e.g., He, Kaiming, et al., "Mask r-cnn. corr abs/1703.06870 (2017)," arXiv preprint arXiv:1703.06870 (2017)).
3. Crop the membrane from the kit, which may be done by the detection model, and extract each individual zone from the membrane, which may be performed by using the kit dimensions provided by the kit manufacturer.
4. Send the extracted zones of the kit to a feature extractor.
5. Send the extracted features to a binary classifier that predicts whether the indicia of interest, e.g., a band/line or dot, is present or absent in the zone.
6. Predict the kit status (positive, negative, invalid) using the binary value(s) from the classifier and a look-up table with a list of matched values for the multiple zones.
7. Store the results of the model in a server and send the predicted kit status back to the user, e.g., to the user's phone.

FIG. 1 illustrates an example pipeline. In step 10, the image of the rapid test kit is input into the system and placed in, or determined to be in, the correct orientation. In step 11, the kit boundaries are determined, and in step 12, the membrane boundaries are determined. The membrane is cropped from the kit, and in step 13 the zones are extracted. The extracted zones are sent to a feature extractor, and the extracted features are sent to a binary classifier that predicts whether the indicia of interest, e.g., a band/line or dot, is present or absent in the zone, resulting in the zone classification, as shown in step 14. In step 15, the kit status (positive, negative, invalid) is predicted using the binary value(s) from the classifier and a look-up table with a list of matched values for the multiple zones.

An example of the few-shot learning framework is as follows. A classification network may be quickly adapted for a new target rapid test kit from a pre-trained model, trained on an existing rapid test kit, different from the target rapid test kit. A relatively large number of samples for the existing rapid test kit may exist. In an example, the model may be trained on a large number of images for a selected base test kit, such as the AssureTech EcoTest COVID-19 IgG/IgM Antibody Test or the OraQuick® In-home HIV test kit or another base test kit. The classification network for the new rapid test kit may be adapted from the pre-trained model by using a small number of images acquired by the new target kit.

Given a membrane of a validated target test kit, the model crops the zone images out of the membrane image. For each zone, the model extracts a feature via a pre-trained feature extractor (e.g., ResNet18), and subsequently passes them into a prototype-based binary classifier (e.g., a fully-connected layer) to output a positive/negative prediction. The model outputs diagnosis according to the zone-level predictions and a look-up table provided by the test kit provider which can be used to interpret the zone patterns and decide the test diagnostic outcome.

Described herein are two main parts for an image recognition model, which parts may be used in conjunction with each other or separately. The first part is to pre-train a robust feature extractor using images from existing test kits, as described in more detail below. The second part applies a few-shot adaptation process to learn a new classifier for the new test kit, as also described in more detail below.

I. EXAMPLE 1

Point-of-care lateral-flow assays (LFAs) are becoming increasingly prevalent for diagnosing individual patient disease status and surveying population disease prevalence in a timely, scalable, and cost-effective manner, but a central challenge is to assure correct assay operation and results interpretation as the assays are manually performed in decentralized settings. A smartphone-based software can automate interpretation of an LFA kit, but such algorithms typically require a very large number of images of assays tested with validated specimens, which is challenging to collect for different assay kits, especially for those released during a pandemic. Here, we present an approach—AutoAdapt LFA—that uses few-shot learning for accurate and automated interpretation of LFA kits that requires a small number of validated images for training. The approach consists of three components: extraction of membrane and zone areas from an image of the LFA kit, a self-supervised encoder that employs a feature extractor trained with edge-filtered patterns, and few-shot adaptation that enables generalization to new kits using limited validated images. From a base model pre-trained on a commercial LFA kit, we demonstrated the ability of adapted models to interpret results from five new COVID-19 LFA kits (three detecting antigens for diagnosing active infection, and two detecting antibodies for diagnosing past infection). Specifically, using just 10 to 20 images of each new kit, we achieved accuracies of 99% to 100% for each kit. The server-hosted algorithm has an execution time of approximately 4 seconds, which can potentially enable quality assurance and linkage to care for users operating new LFAs in decentralized settings.

Introduction for Example 1

Lateral-flow assays (LFAs) present an increasing opportunity for increasing accessibility to diagnostic assays, but errors in assay operation and results interpretation hinder their deployment in decentralized settings, such as primary care clinics and homes (References 1-5). For example, improper assay operation could produce absent control bands; alternatively, failure to identify the presence of faint bands or confusing the zone type (e.g., control vs. test bands) could lead to an incorrect interpretation of overall assay result (Reference 6). For example, in the COVID-19 pandemic, a number of SARS-COV-2 antigen tests are now approved for home use (Reference 7) to support decentralized testing; consequently, user errors from incorrect operation and results interpretation are also likely to become more prominent in the coming months to years.

Image-processing algorithms to automate the interpretation of LFAs and rapid diagnostic tests can potentially provide quality assurance to users in decentralized settings and reduce incidence of these errors, but existing algorithms have shortcomings such as the need to use images collected by smartphones with physical attachments (References 5, 8-14), are designed to work retrospectively with a library of pre-collected images (References 15, 16), or require a large number of labelled training images ranging in the hundreds (References 17, 18) for each assay kit. By comparison, an ideal algorithm would be scalable in deployment (for example, working in real time with images collected by a smartphone camera without an extra adapter) and would not require experimental collection of a large number of expert-labelled images with validated clinical specimens across a large and ever-changing roster of new LFAs, which is especially challenging to achieve during public health emergencies.

Figure 2A:
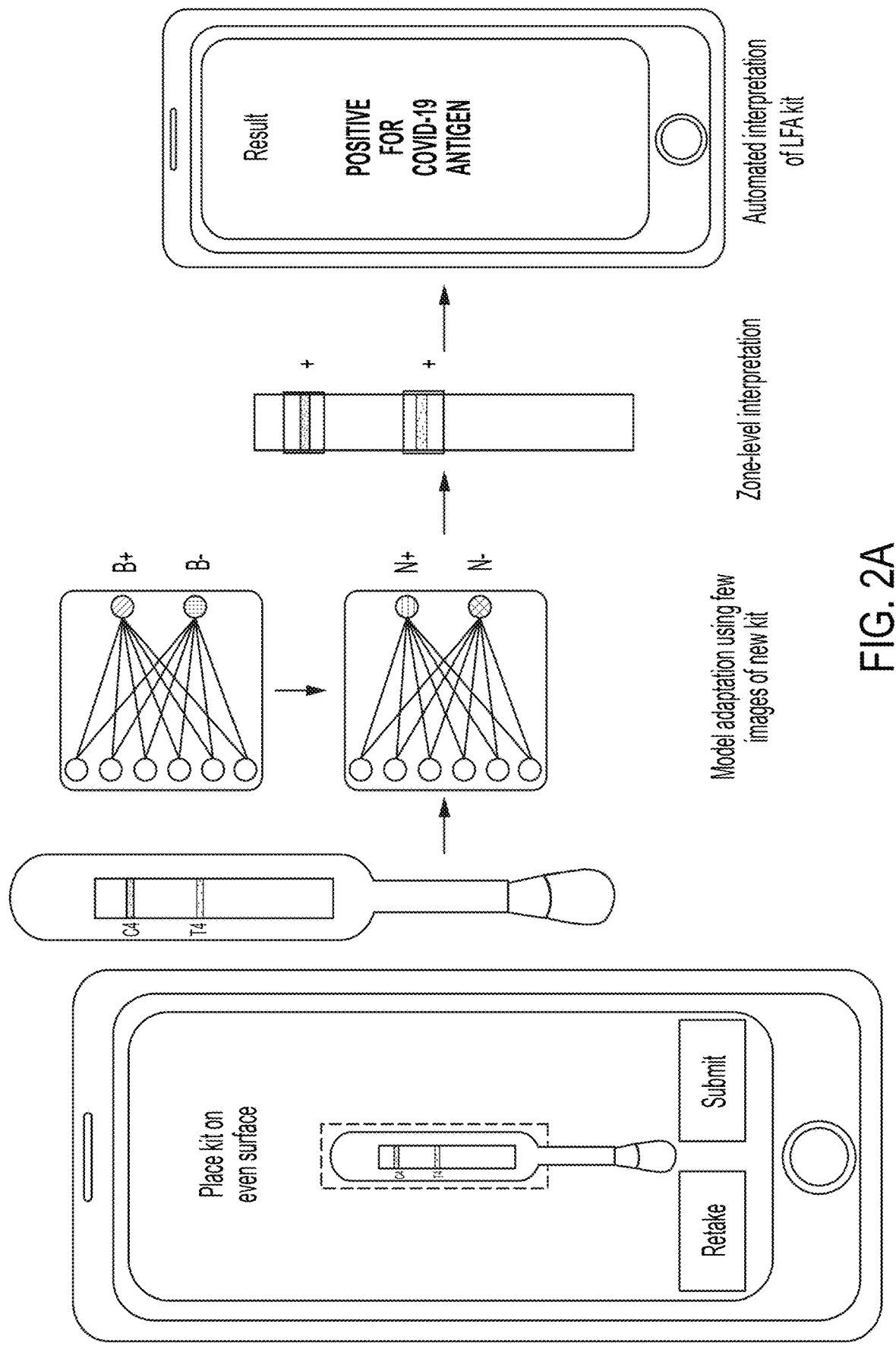
FIG. 2A illustrates an overview of an example testing process in accordance with some embodiments of the disclosure.

In this study, we have developed 1) an end-to-end modular workflow to work with assay kit images taken with a smartphone with no external adapters and 2) a trained algorithm that can be adapted to a new assay kit with just 10 to 20 images of the new kit in order to accurately interpret the result (FIG. 2A). The ideal algorithm should generalize to different LFA kits with variations in color and size of bands (References 1, 19-22): the color and intensity of bands depend on sizes and shapes of gold nanoparticles (References 20, 23), material properties of the membrane, and membrane pretreatment steps (References 20, 21); the sizes of bands depend on liquid-dispensing conditions and capillary flow time (References 20, 21). Here, we propose a few-shot adaptation strategy—which has been employed in applications ranging from computer vision to robotics (References 24-26) to learn a strong classifier for new domains (References 27-31)—to mitigate the performance drop caused by domain shift stemming from image-pattern variance, using only a few labeled images. In our few-shot model adaptation strategy, zone areas from many images of a "base" kit are cropped and used to pre-train a feature-extraction network that employs self-supervised learning with edge-filtered images. To adapt to a new assay kit, zone areas from 10 to 20 images are cropped, and the pre-trained model from the base model (shown as "B" in FIG. 2A) adjusts its weights to a model adapted to a new assay (shown as "N" in FIG. 2A) using supervised contrastive learning. Thus, for the end user operating a new assay kit, zone areas from an image of the kit are cropped, and the adapted network automatically and accurately interprets the bands at each zone and overall assay result.

Figure 2C:
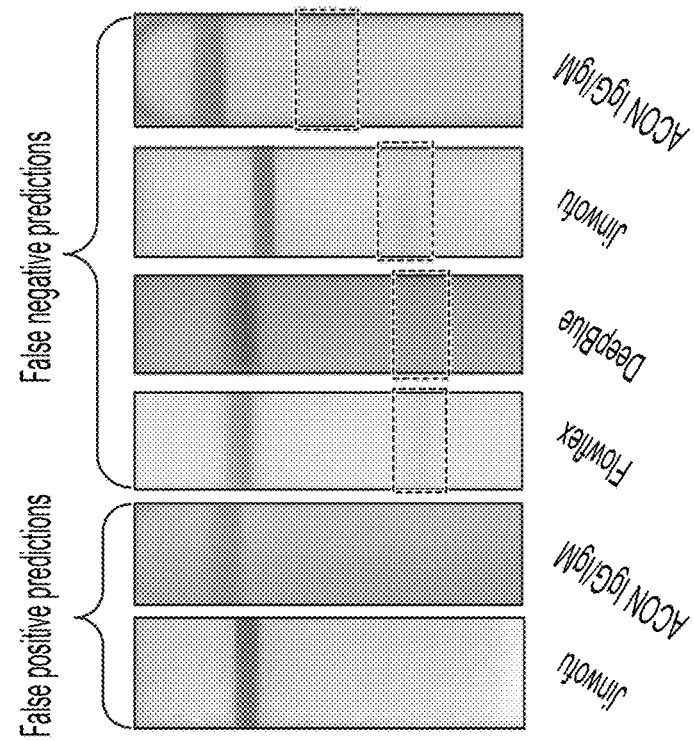
FIG. 2C shows example images that may generate false positive or false negative predictions in an automated interpretation model.
Figure 2B:
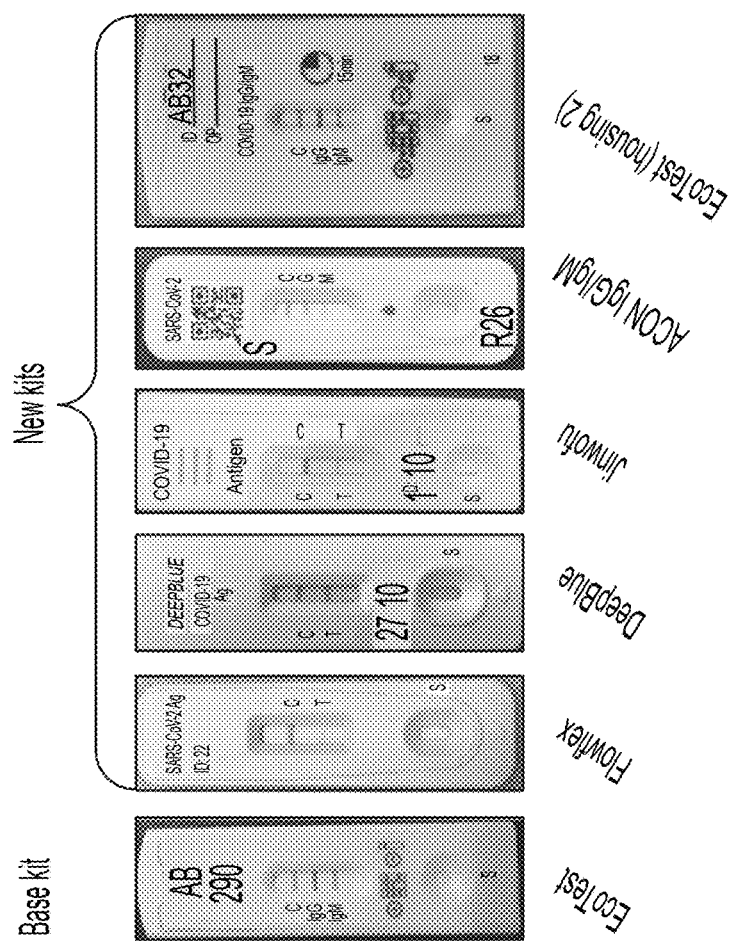
FIG. 2B shows an example base test kit for pre-training an example model and five novel kits to which the model may be adapted.

In this study, we pre-trained a base model using expert-labelled images from the AssureTech EcoTest COVID-19 IgG/IgM Antibody Test, an assay authorized by FDA, and adapted the model to interpret LFAs from five other commercial COVID-19 LFAs (FIG. 2B). The five LFAs include three antigen tests (ACON Flowflex SARS-COV-2 Antigen Rapid Test, Anhui DeepBlue SARS-COV-2 Antigen Test, and Jinwofu SARS-COV-2 Antigen Rapid Test), one antibody test (ACON SARS-COV-2 IgG/IgM Antibody Test), and an AssureTech EcoTest COVID-19 IgG/IgM Antibody Test kit that uses a different housing (denoted in the paper as 'EcoTest (housing 2)') but retains use of the same LFA membrane (FIG. 2B). Like almost all commercial LFAs, these kits share rectangular control and test bands, but differ in kit housing dimensions and membrane dimensions, as well as number, spacing and color of bands (kit-specific dimensions shown in Supplementary Table 1 (all tables for Example 1 are shown at the end of the description of Example 1)). To illustrate the challenge for interpreting new assay kits, without few-shot adaptation, this pre-trained algorithm produced incorrect predictions (both false positives and false negatives) due to variations in color and intensities of bands and membranes across new LFA kits (FIG. 2C).

Overview of Pipeline

Figure 2D:
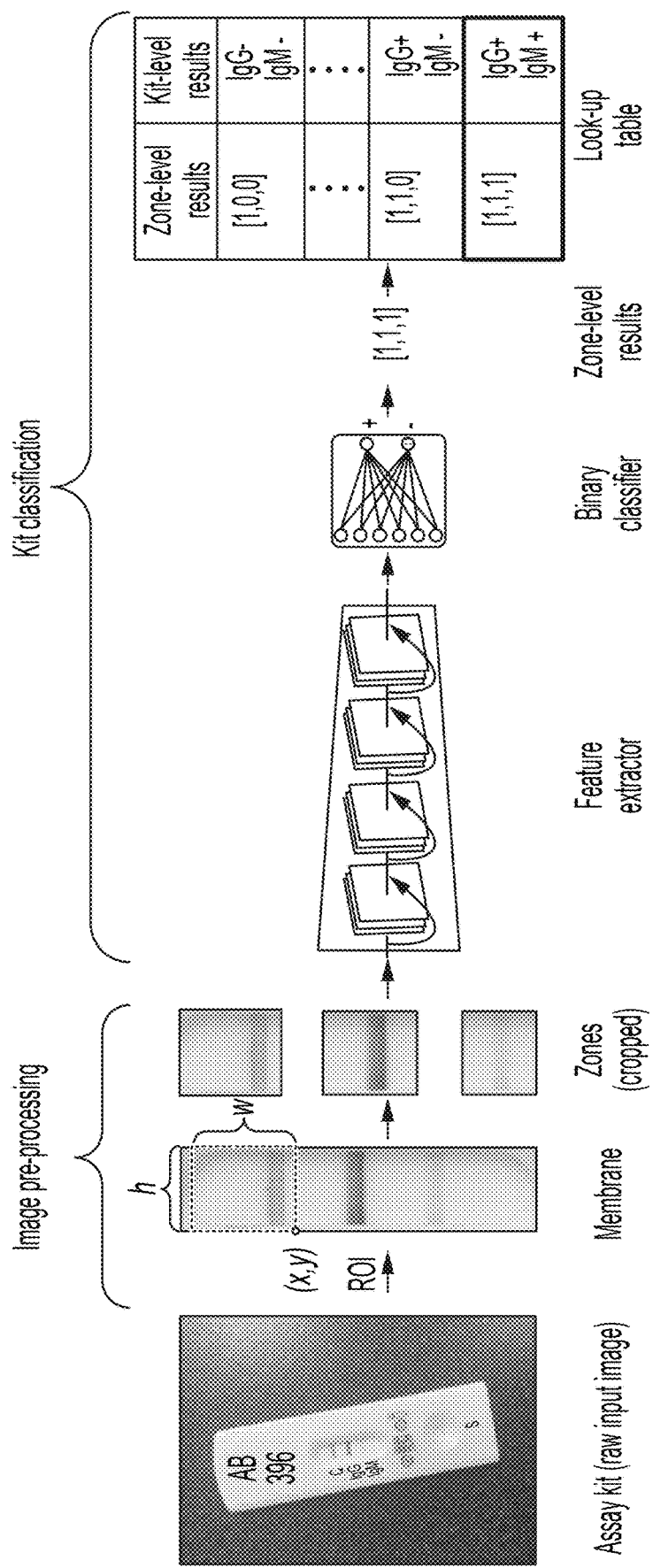
FIG. 2D illustrates an example pipeline in accordance with some embodiments of the disclosure.

In the AutoAdapt LFA algorithm (FIG. 2D), a user takes an image of an LFA kit, which enters a cloud-hosted pipeline with an instance-segmentation model that corrects the orientation and perspective of the raw image, segments the assay kit from background and the membrane from assay kit, and crops individual zones (i.e., regions in the membrane corresponding to bands and a portion of surrounding area) from the membrane. Next, images of zones enter a feature-extraction network, which is learned in order to generate robust feature representation as unique signatures to discriminate positive cases from negative cases under diverse conditions (e.g., color, intensity, and width of bands); the feature-extraction network also adapts to new LFA kits with a small number of images. From latent feature vectors for each zone, a binary classifier recognizes colored rectangular bands, the form factor seen in the vast majority of LFAs (References 32, 33), and determines whether a band is present or absent in each zone. Finally, an assessment of the LFA kit result is obtained by comparing the output of the binary classifier with a lookup table containing all combinations of possible zone-level classification results; this kit-level classification is sent to the user's smartphone as an interpreted LFA result. The server-hosted algorithm has a mean execution time of 3.55±2.28 seconds. Overall, this rapid automated interpretation pipeline could fit within a larger digital platform (References 34-37) that collects demographic data for epidemiology and provides instructions to carry out the test as well as follow-up linkage to care; See FIG. 5.

Figure 3A:
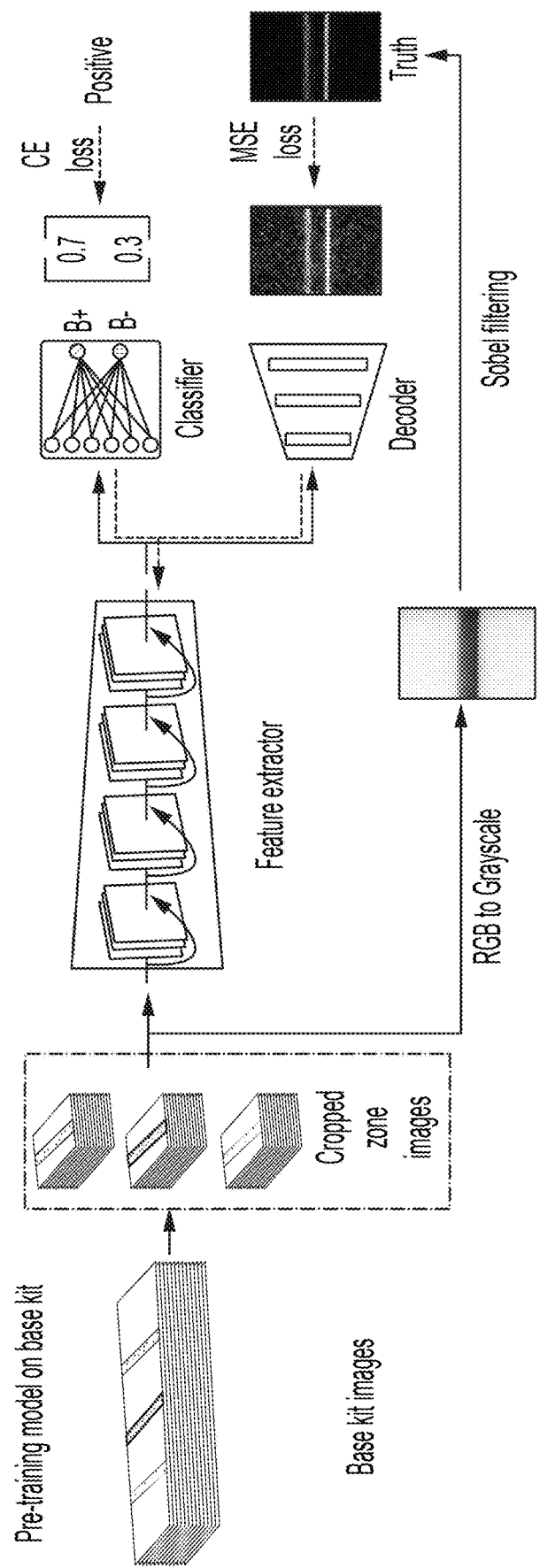
FIG. 3A illustrates an example framework for pretraining using a self-supervision process in accordance with some embodiments of the disclosure.
Figure 3B:
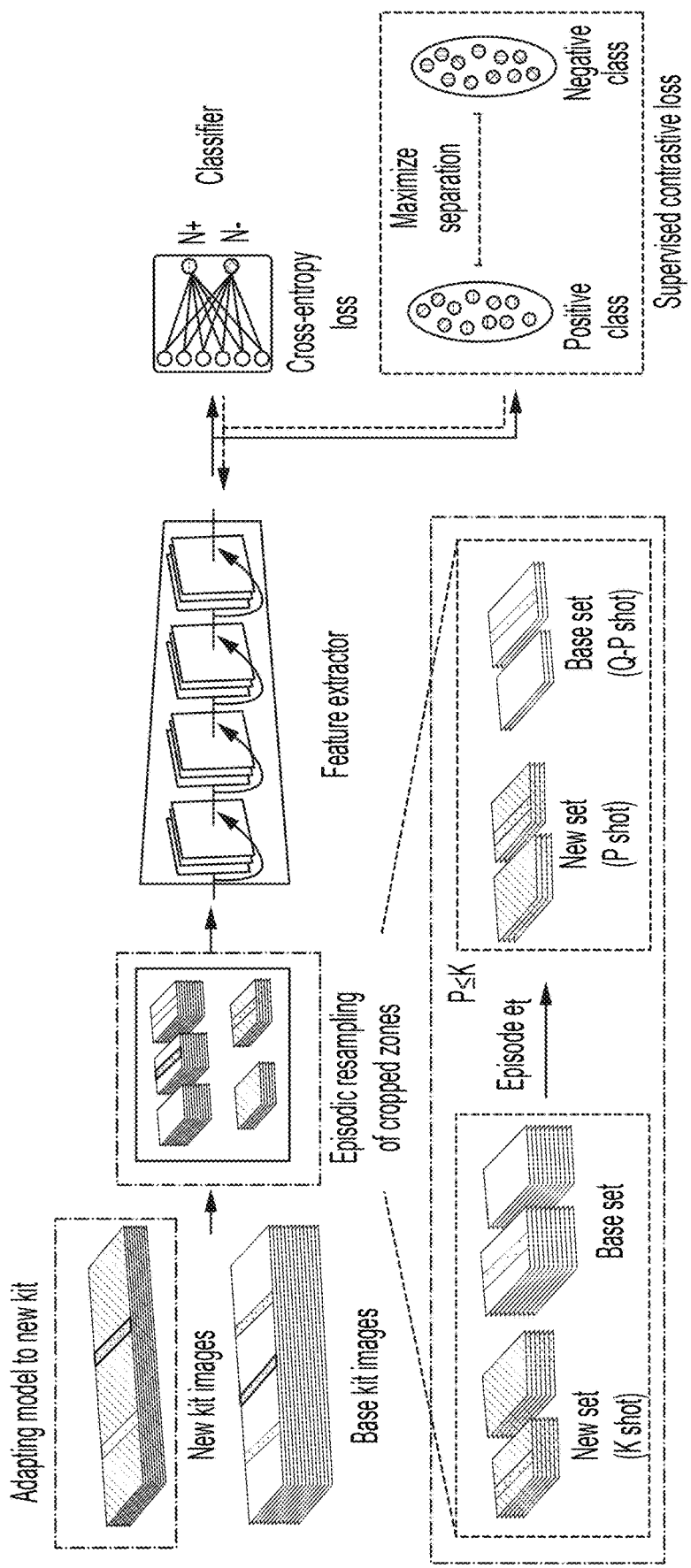
FIG. 3B illustrates an example framework for model adaptation using few-shot learning in accordance with some embodiments of the disclosure.
Figure 4A:
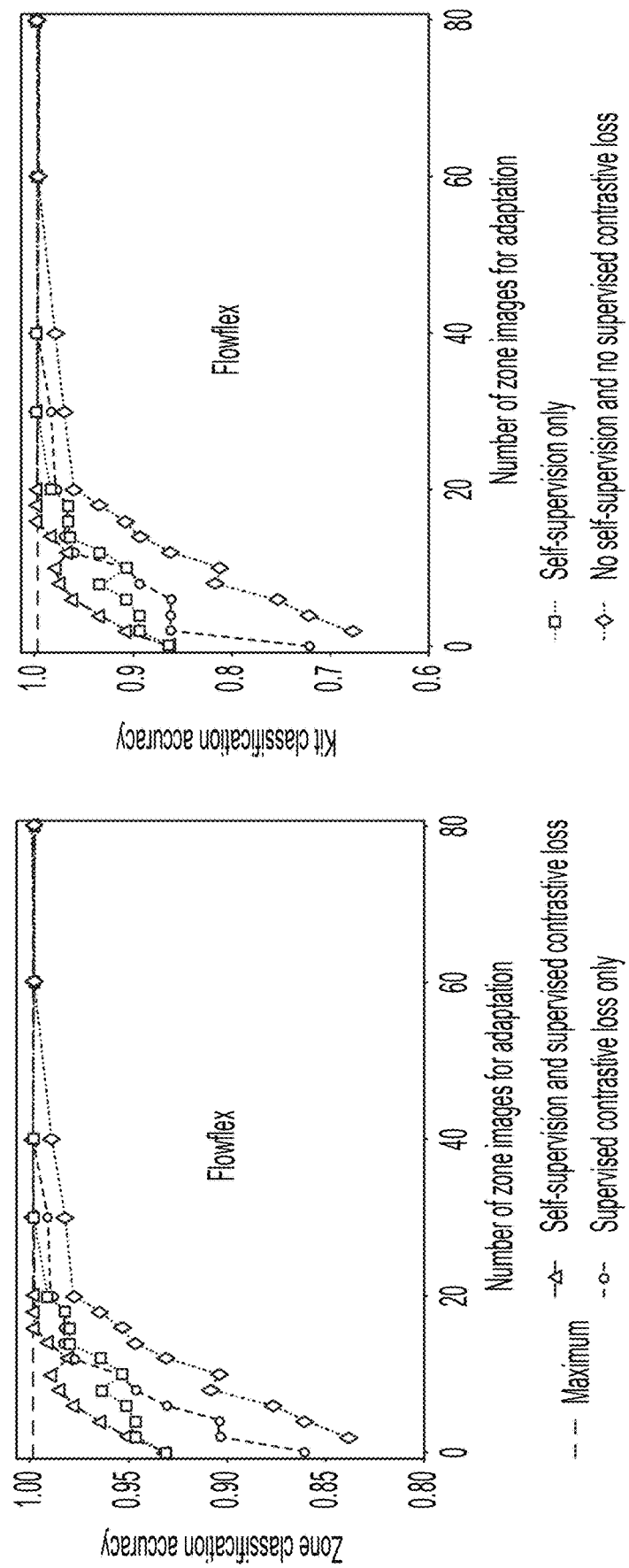
FIG. 4A illustrates zone-level and kit-level accuracies for a first example novel kit using an ablation study of an example model and varying the number of images used in model adaptation.
Figure 4B:
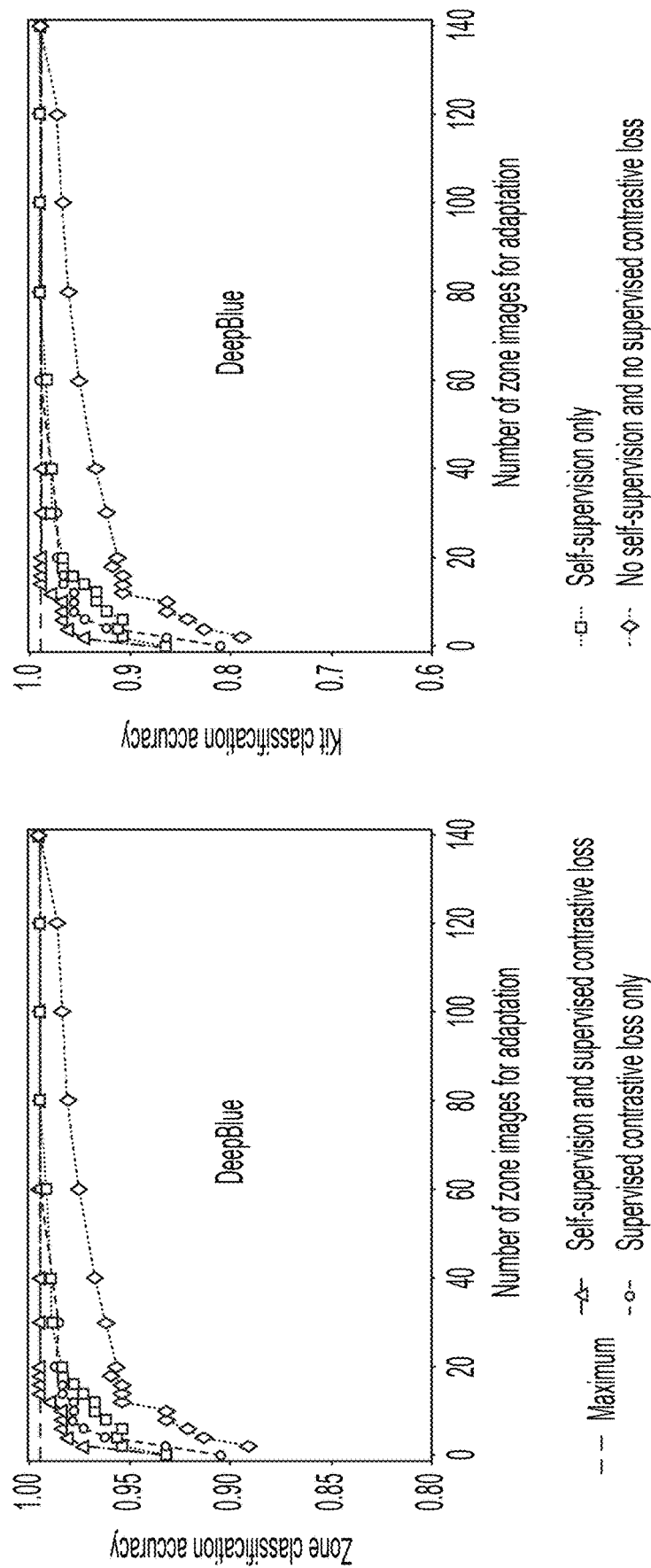
FIG. 4B illustrates zone-level and kit-level accuracies for a second example novel kit using an ablation study of an example model and varying the number of images used in model adaptation.
Figure 4C:
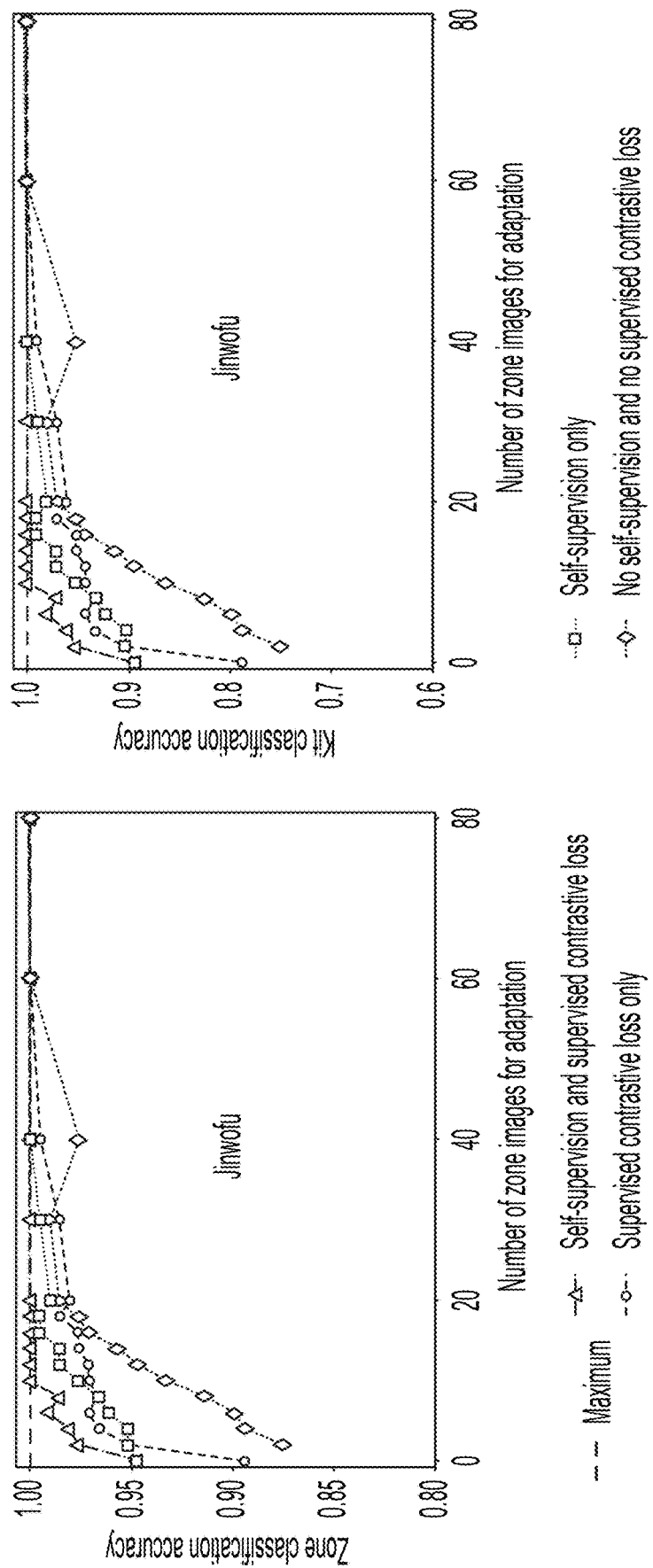
FIG. 4C illustrates zone-level and kit-level accuracies for a third example novel kit using an ablation study of an example model and varying the number of images used in model adaptation.
Figure 4D:
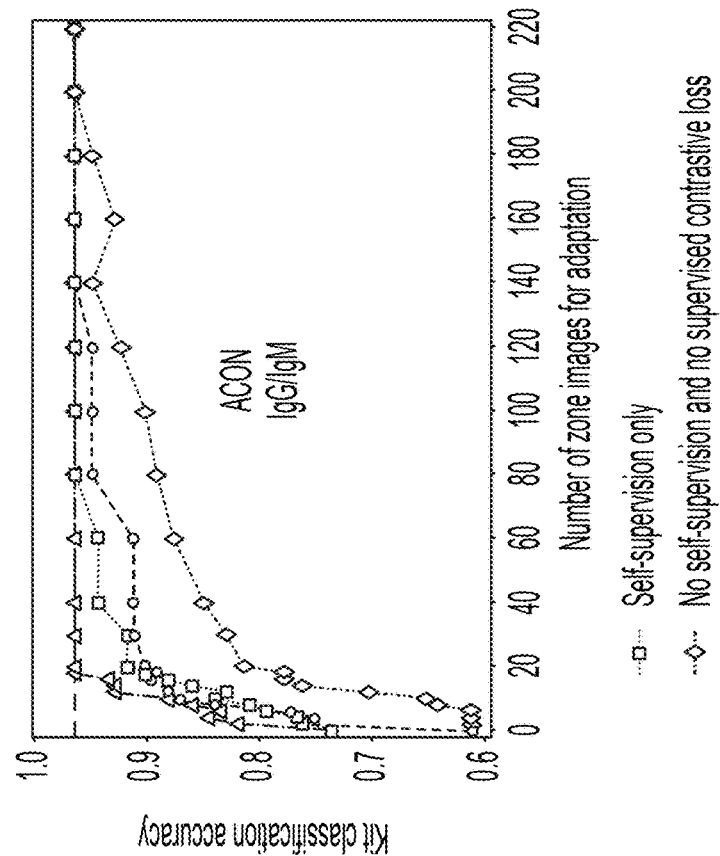
FIG. 4D illustrates zone-level and kit-level accuracies for a fourth example novel kit using an ablation study of an example model and varying the number of images used in model adaptation.
Figure 4D:
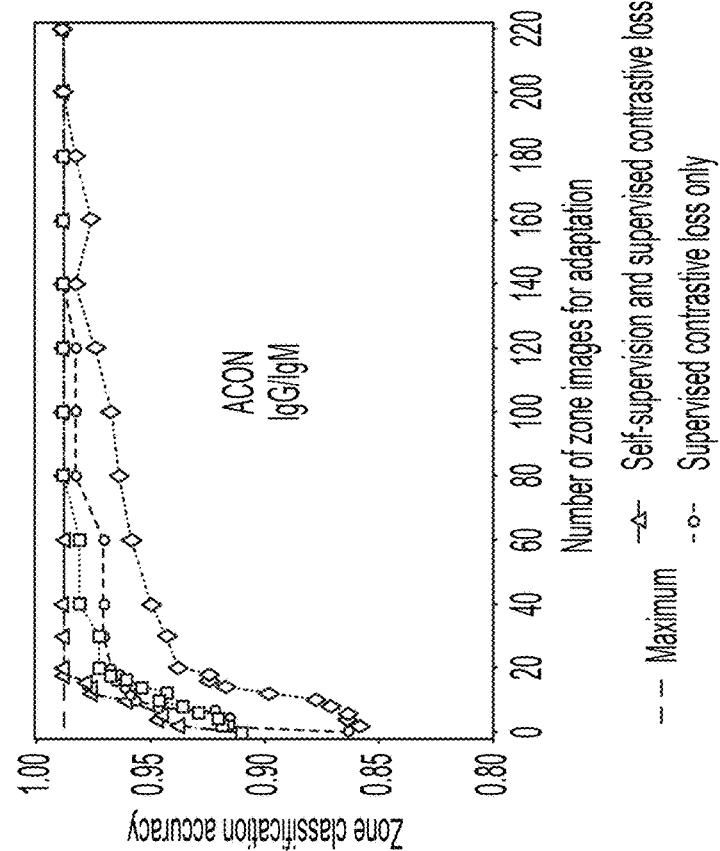

To develop this pipeline, we framed the objective as learning the optimal parameters of the feature-extraction network and the classifier module by minimizing the loss functions given a set of training images for an assay kit. Unlike methods that require de novo training on a new LFA kit, we developed two novel methods to achieve adaptation requiring only a small number of images of new kits. First, to ensure the underlying feature representation is robust against variations in the LFA images, we developed a feature extractor that learns to extract robust latent representation of zone images for classification; these latent representations are also used to reconstruct (decode) the edges associated with the images. This auxiliary edge reconstruction task is in addition to the standard fully-supervised classification task and helps learn feature representation for effective adaptation, which is based on the observation that edges in an image tend to remain invariant in diverse LFA images. As shown in FIG. 3A, edge-preservation can be learned in a self-supervised manner (not requiring manually-assigned labels), by using the output of an automatic edge detection algorithm (Sobel filter (Reference 38)) as the ground truth for decoding. Second, as shown in FIG. 3B, our system performs supervised contrastive learning using a dataset combining images from the new LFA kit and the base LFA kit and learns a new classifier for the new kit. Here, the neural network model pre-trained on a set of labeled LFA images from the base kit is adapted to a new target LFA, using 10 to 20 labelled training images of a new kit.

Image Pre-Processing

For model training as well as during inference, the first module corrected for skew and extracted the zones from the images of LFA kit. This module first detected the orientation of the kit and carried out perspective correction using the predicted segmentation mask of the LFA kit (See FIG. 6). This mask was generated by using Mask R-CNN (Reference 39), an instance segmentation model (more details in Methods). The kit membrane from the perspective corrected image was then localized and individual test zones were cropped out using the kit-specific dimensions listed in a JSON (JavaScript Object Notation) file. For this study, the test-specific dimensions, such as kit height, kit width, membrane width, membrane height, and zone dimensions, were measured from images of LFA kits using Adobe Photoshop v21.0.2 and saved as a JSON file. These dimensions could be directly provided by the kit manufacturers in the future. To measure the accuracy of the automatic membrane segmentation step, we measure the intersection over union (IoU) scores between the segmented membrane and the manually annotated ground-truth membrane region. IoU scores of about 90% or greater for all the assay kits (Table 1) confirm the robustness of this first step.

Pre-Training of Feature Extractor with Edge Detection and Self-Supervised Learning The cropped test zones were fed into a feature extractor and the extracted features were passed into a binary classifier and a decoder (FIG. 3A). The binary classifier (a fully connected layer) outputs '0' or '1' to denote the absence or presence of the band in the cropped zone, respectively. The images from the base LFA kit were manually annotated with the binary labels, and the classifier was trained to learn specific prototypes associated with the positive and negative classes using cross-entropy (CE) loss. Other types of loss may be used in this supervised training of the classifier.

Images of kits with faint bands can lead to false negatives while stained membranes and lighting artifacts can lead to false positives (FIG. 2C). Even though such failure cases can be reduced by training on a large number of relevant examples, acquiring sufficient images on a new LFA kit present a logistical challenge. Directly applying the model conventionally trained on the base LFA kit (i.e., by minimizing only the CE loss) to new LFA kits resulted in low classification accuracy on the new kits. Hence, we designed a self-supervised, edge-enhanced image reconstruction task to improve the generalizability of the feature extractor (FIG. 3A). The network was trained to detect the edges of the image pattern (pixels at the junction between the membrane background and the band in the zone) and reconstruct the corresponding edge-enhanced image. This task is self-supervised: starting with RGB images of zones from a base LFA kit, the model converted the image into grayscale and applied a Sobel filter (Reference 38) to generate the ground truth image set (Sobel filter is a basic image processing algorithm that generates an image emphasizing edges). In parallel, the model fed the extracted features into the decoder to reconstruct the edge-enhanced image. This model was then trained to minimize the mean squared error (MSE) between the reconstructed edge image from the decoder and the ground truth edge image. By combining the fully-supervised image classification with the self-supervised edge-enhanced image reconstruction, the feature extractor, classifier, and decoder were trained jointly to optimize the zone classification accuracy as well as to learn a good feature representation that is sensitive to edge information.

Learning a New Classifier for a New LFA Using Few-Shot Adaptation

The pre-trained model from a base LFA kit was adapted to a new LFA kit with minimal retraining via few-shot adaptation (FIG. 3B). We mixed the labeled data of the base LFA kit and the new LFA kit and used this as the training set. We specifically used this mixture of data from new kit and base kit to avoid overfitting to the small number of images of the new kit. In addition to the CE loss used to train the binary classifier for the new LFA kit, we also used supervised contrastive learning, between the cropped zone images of both the new kit and the base kit, to refine the feature extractor.

We gathered the cropped zone images of both the base kit and the new kit, resampled the data, and calculated the supervised contrastive (SupCT) loss (Reference 40). First, we extracted features of the base kit cropped zone images for both positive and negative classes and considered them as anchors. Next, we extracted features from the cropped zone images of the new kit and compared them with all of the anchors using cosine similarity. The feature extractor was then trained to maximize the cosine similarity between features of the same class. For the implementation, we resampled the cropped zone images from the mixed dataset to build episodes and then computed SupCT loss within each episode (more details in Methods). As a comparison to the adaptation strategy, we also performed fine-tuning which only calculated the CE loss among samples within the episodes for network updating.

Results

Description of Datasets

While gathering the image dataset, we varied imaging conditions by using different phones and imaging the assay kits under varied lighting conditions (more details in Methods). For pre-training of the model, the training dataset from the base kit (AssureTech EcoTest COVID-19 IgG/IgM Antibody Test) consisted of 383 membrane images (674 positive zones and 475 negative zones). An additional 254 membrane images (441 positive zones and 321 negative zones) were used as the validation set for model selection under the fully-supervised classification task.

In addition, we used a variational autoencoder (Reference 41) to generate a synthetic dataset composed of 600 zones each of faint positive and negative zones (Reference 42). The synthetic data was mixed with the training dataset for the self-supervised edge-reconstruction task. Thus, the images in the synthetic dataset were included with the training dataset for the steps of self-supervised pre-training of the feature extractor as described herein (e.g., converting the images to grayscale, edge filtering, normalizing, setting the normalized images to ground truth, generating feature-extracted images from the input images, using a decoder to reconstruct images from the feature-extracted images, determining loss between the reconstructed images and the ground truth images, and using the loss to update parameters of the feature extractor).

The performance of base model is reported on an evaluation set consisting of 102 membrane images (168 positive zones and 138 negative zones) of the base kit. The results (Table 2) demonstrate that our model works well for both zone-level classification and overall kit-level classification on the base kit. A "zone-level" classification accuracy is the model's performance on all the zones for the entire evaluation data set, and "kit-level" classification accuracy is the model's performance in classifying all constituent zones of a single kit (e.g., a kit-level result would be incorrect if any zone in that kit was classified incorrectly). Details regarding the dataset for the five new kits are provided in Supplementary Table 2.

Performance on 5 New COVID-19 Tests

We employed the pre-trained feature extractor using the few-shot adaptation strategy on five COVID-19 LFA kits, and assessed the effects of our adaptation strategy and self-supervised edge-detection task separately. The performance of the base model on the new kits are shown when applied directly and with the proposed adaptation method using 10-shots (20 zone images) highlighting the significant performance improvement seen using our few-shot adaptation strategy (Table 2). On top of the pretrained base model, adaptation can consistently improve the performance by including only a few training images of the new LFA kits. The EcoTest housing 2 kit was identical in all aspects to the base kit expect for the housing, so the direct application of the base model without any adaptation was able to achieve 100% zone-level and kit-level accuracies.

In FIGS. 4A-4D, we plot the classification accuracy, at zone level and kit level, against the number of zone images used during the adaptation process, ranging from 0 (direct testing) to using the entire training dataset. These figures also serve as the ablation study evaluating the separate contributions made by self-supervision in pretraining the feature extractor as well as the supervised contrastive learning during adaptation. We compare our adaptation approach with three alternative approaches: 1) the proposed approach without the self-supervision component in the pre-training stage, 2) the proposed approach without supervised contrastive loss during adaptation, and 3) training the network for a new kit from scratch without the two components. The second approach can be considered as a finetuning process that uses the pre-trained base model and finetunes it with the standard CE loss. For all approaches, the base kit and new kit images were mixed for network training, and the same data sampling strategy was used to ensure a fair comparison.

For each kit, a random set of images of each class were selected from the training dataset for model adaptation, and performance of the trained model was validated against a separate evaluation dataset. The plots for the different approaches are compared against the performance upper bound achieved when using all the new images available for training mixed with the base training images for the classification task. We showed that for each of the kits, Flowflex, DeepBlue, Jinwofu, and ACON IgG/IgM, we achieved maximum classification accuracy using just 16, 14, 10, and 18 zone images respectively for the adaptation. For example, we were able to adapt the base model to the Flowflex kit (FIG. 4A) using only eight zone images per class (16 zone images) and reach the same performance (99.8% and 99.6% for the zone and kit levels respectively) as a model trained from scratch using all available training data (200 zone images). The results confirm that both self-supervised pre-training and supervised contrastive loss help, and the combination of these two key ideas helps reach the highest attainable performance.

In addition, as the feature extractor is pretrained under self-supervision, the extracted features are sensitive to the edges and can work well even when zones with faint bands are encountered. Even though the ACON IgG/IgM kit had the highest frequency of faint bands in our dataset, our approach was able to reach the same performance as using entire training dataset (FIG. 4D) using only nine images of each class (18 zone images). Adaptation without supervised contrastive learning can also reach the same performance using 40-shot adaptation. For the model trained without self-supervised pretraining, 70 images (with SupCT loss) and 100 images (without SupCT loss) of each class were required to reach the best performance. In addition, direct testing performance (0-shot adaptation) of the model pre-trained on the base kit was higher when trained using self-supervision than when trained using only the CE loss.

Table 3 shows the confusion matrices of the performance of the optimum shot adaptation when evaluated on the evaluation dataset. By starting with a base model pretrained on an existing LFA kit (AssureTech EcoTest COVID-19 IgG/IgM antibody assay kit), we have shown that it is possible to adapt the existing model to different assay kits, which have different numbers of test lines and form factors, using a small fraction of the images needed to train the base model with no loss in accuracy. In addition to evaluating the confusion matrix on samples in the evaluation set, we devised an ambiguity region to evaluate the distribution of detection scores (probability of positive class). The ambiguity region is bounded by the detection score thresholds such that an image will be correctly classified only if the probability of the ground truth class is high. The thresholds can be either manually set or statistically estimated with 95% area under the curve (more details in Methods). We checked the detection scores of all the images in the evaluation dataset against the ambiguity regions and those images with scores falling in ambiguity region were not classified. We computed the percentage of images that were categorized as ambiguous as well as the accuracy over the images that were classified. Since the detection score for the false predictions were close to 0.5, they fell into the ambiguity region. Therefore, by using this concept of the ambiguity region we were able to treat most of the failure cases as ambiguous while keeping the number of true predictions that fell into the ambiguity region to a minimum. This further increased the classification accuracy among the classified samples consistently over four new target kits (Table 3).

Conclusions for Example 1

We have described the development of AutoAdapt LFA, an approach for the adaptation of a LFA kit interpretation model trained on one kit to new kits, each with a different form factor. We showed that this adaptation can be carried out using a much smaller subset of images than what was used for training the base model. Compared to de novo training on every new assay kit, this reduction in the number of images was achieved by adopting a modular approach to the machine-learning pipeline: starting from an image of the kit, the perspective-corrected membrane and individual zones were extracted followed by the extraction of the features preserving edge information, and finally a binary output which indicated whether a band was present in the cropped zone. A robust feature extractor is important for handling challenging images in LFA kits like those with faint or partially formed lines. Our approach of using self-supervision to extract features preserving edge information addressed this issue, and it is believed that this use of self-supervised learning to reconstruct edge-enhanced images has not been previously demonstrated. To our knowledge, the application of few-shot learning, including this adaptation framework, has not been demonstrated for interpretation of LFA kit images. Thus, we have shown that using this novel approach, we can train accurate classification models using a fraction of kit images than would be required in de novo training.

In terms of impact for medicine, this reduction in new training images to achieve assured user interpretation of rapid test images is significant with the rise of use of rapid diagnostic tests. Most immediately, the COVID-19 pandemic has thrusted front and forward the need for rapid testing and population surveillance to track and control the spread of the disease in a scalable and timely manner. If effectively implemented, point-of-care testing can contribute significantly to a rapid and effective public health response—as well as patients' individual safety, privacy, physical health and mental well-being—by enabling widespread timely testing in a manner that does not overwhelm the limited capacity of testing facilities or provoke social crowding at selected testing sites. By expediting the process of training a model to newly available rapid diagnostic tests, the AutoAdapt LFA approach could facilitate reliable decentralized testing and real-time monitoring of disease prevalence. In the longer term, the need to achieve assured user interpretation will rise as patients and consumers will more frequently monitor their health via self-testing for both infectious diseases and chronic conditions, in an age of precision health. The approach can be implemented on a variety of rapid tests, and used on test kits beyond rectangular bands (for example, as in some vertical flow assays) as well as on test kits beyond signals of single colors (for example, some urinalysis kits with color-based readouts).

Methods

Dataset Collection

Base kit (AssureTech EcoTest COVID-19 IgG/IgM Antibody Test): train and validation datasets were gathered using iPhone X at the Mayo Clinic Hospital, Phoenix, AZ. The evaluation dataset images were gathered using three phones by two users: iPhone X, iPhone 7, Samsung Galaxy J3 (SM-J337V). Care was taken to ensure that the kits were imaged under three different ambient lighting conditions (warm white, cool white, and daylight).

Novel kits (ACON Flowflex SARS-COV-2 Antigen Rapid Test, Anhui DeepBlue SARS-COV-2 Antigen Test, Jinwofu SARS-COV-2 Antigen Rapid Test, and ACON SARS-CoV-2 IgG/IgM Antibody Test): training and evaluation sets were gathered using iPhone X at the Mayo Clinic Hospital, Phoenix, AZ. Serum samples for the antibody tests were collected under Mayo Clinic IRB 20-004544 or shared by the Department of Laboratory Medicine at the University of Washington School of Medicine (Seattle, WA) (Reference 43). Nasopharyngeal swabs from Mayo Clinic Hospital patients were heat fixed and run for the antigen tests (Mayo Clinic IRB 20-010688). All assay kits were imaged within 10 minutes of running the test.

Image Acquisition and Pre-Processing Based on Mask R-CNN

The image processing workflow starts with an image of the assay kit being taken by the user through the SMARTtest application (Reference 18) in a fixed portrait orientation. This image is saved in an Amazon Web Services (AWS) Simple Storage Service (S3) bucket as a JPEG image from the frontend, and the corresponding URL is sent to the AWS Lambda Function. The function reads the image data, stores the original resolution image in a copy, and resizes the image while preserving the aspect ratio by capping the height of the image to a maximum of 800 pixels. The membrane is localized in the resized image using the instance segmentation model Mask R-CNN (See FIG. 6), and the predicted bounding box coordinates in the resized image are then transformed to the corresponding coordinates in the image of the original resolution to get the highest possible resolution of the membrane which is then sent to the classifier.

Figure 7:
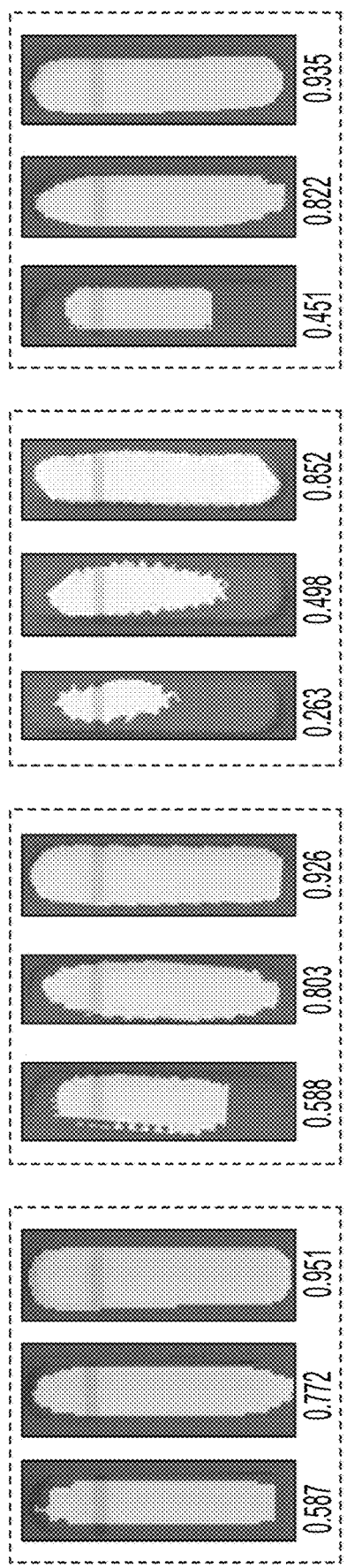
FIG. 7 illustrates example Intersection over Union (IoU) scores for membrane segmentation.

Mask R-CNN (Reference 39) builds on top of the preceding Faster R-CNN (Reference 44) and Fast R-CNN (Reference 45) models and combines them with a fully-convolutional network (FCN) and introduces object mask prediction (i.e., segmentation (Reference 46)) in parallel to bounding box regression. Given an input image, the model extracts feature maps via a pretrained deep neural network (e.g., VGG16), and subsequently passes these in parallel through a ROI-specialized pooling layer followed by several fully-connected layers and an FCN. The instance segmentation model has been trained for two object classes: the kit and the membrane. The model outputs i) detection scores, ii) bounding boxes, and iii) segmentation masks of a maximum of 100 objects. The bounding box defines a rectangular area that contains the assay kit or the membrane. The segmentation mask includes all the pixels that correspond to the actual area of the assay kit or the membrane and do not necessarily have to be rectangular in shape. From all the detected objects we retain information for a kit and membrane object with the highest detection score greater than 0.9. FIG. 7 illustrates different IoU scores and the corresponding membrane segmentation masks for the EcoTest (base kit).

The bounding boxes and segmentation masks of the kit and membrane with the highest detection score are retrieved and a binary segmentation mask is generated for both kit and membrane. Next, the rotation angle is estimated by performing contour detection on the segmentation mask of the kit and membrane, and approximating a minimum-area quadrilateral mask whose corner coordinates can be used to construct a right-angle triangle. The membrane is cropped from the input image with the binary segmentation mask, and is subsequently rotated by the estimated angle. The rotated membrane will have black regions if the estimated angle is greater than zero, and the largest rectangle that doesn't include any black pixels is estimated and extracted as the final membrane to be sent to the classifier. Additionally, we have the capability to compute the homography matrix (Reference 47) between the predicted segmentation mask and bounding box of the kit, and use it to transform the kit of the image to correct for distortion along the pitch axis.

Pre-Training with Self-Supervised Learning

The model uses the Mean Squared Error (MSE) between the decoder output (the reconstructed image) and the ground truth edge-enhanced image as the loss. Other loss calculations may be used, such as, for example, mean absolute error or other loss terms. For the base kit, the number of labeled images were sufficient so that both the classification and the edge-enhanced image reconstruction tasks were carried out to learn a good feature extractor. Thus, as shown in FIG. 3A output features of each cropped zone are sent to both the classifier and the decoder. The model uses the cross-entropy (CE) loss for the classification task and uses the MSE between the reconstruction and the automatically reconstructed edge filtered image to learn the optimal convolution kernel in the decoder for the self-supervised edge reconstruction task. By using the edge-enhanced features, the feature extractor was able to generalize well on new assay kit images even if the zones were faint.

To generate the ground-truth of the self-supervision task, the model first converted the RGB image into a grayscale image, and then performed edge filtering using Sobel filtering to highlight the pixels in the edge region (if an edge exists). The edge filtered images are then normalized between 0 and 1 and set as labels for the self-supervision task.

With the annotated classification label and the self-generated edge detection label, the equally weighted CE loss and MSE were summed up and used as the objective. In this manner, the extracted features were made sensitive to the edge region and the encoded edge information was used for the classification of cropped zone images including those with faint bands.

Hyperparameter Selection

Instance Segmentation Model Structure:

We used the ResNet50 CNN as the backbone of the Mask R-CNN and pretrained it on the ImageNet1K dataset for model initialization. The backbone has been trained on ImageNet1K as a fully-supervised image classification task among 1,000 classes. We used a hidden layer size of 256 for the mask predictor.

Instance Segmentation Training:

We used 50 epochs and Adam optimizer for all of the training processes. We pretrained the model on a training subset of 50 images of the base kit with a learning rate of 5E-5 and achieved an IOU score of 0.93 on an evaluation set of ten images. We then finetuned the model on the new assay kits with a learning rate of 5E-6 using 10 training images and evaluated the performance on 10 evaluation images. We used the following train-time augmentations: (i) horizontal flip, (ii) scaling, (iii) aspect-ratio modification, (iv) brightness adjustment, (v) contrast adjustment, (vi) hue adjustment, (vii) saturation adjustment, (viii) color distortion, (ix) jitter addition, (x) cropping, (xi) padding, and (xii) Gaussian noise addition. Supplementary Table 3 shows the results from the test of robustness of the instance segmentation model using bootstrapping.

Classification Model Structure:

We used the ResNet18 CNN as the feature extractor and pretrained the model on the ImageNet1K dataset for model initialization (Reference 48). The feature extractor has been trained on ImageNet1K as a fully-supervised image classification task among 1,000 classes. As shown in FIG. 3A, during the pretraining on base kit images, classifier is configured as a fully connected layer (top output) and the decoder is configured as a stack of three deconvolution layers (bottom output).

Classification Model Pre-Training:

Given a training set, all the images were fed into the model in sequence and the loss was calculated for both gradient backpropagation and for updating the model. A single epoch is completed when the model has seen all the images once. 90 epochs were run in our training process. The performance of the model on the validation dataset was determined after each epoch and the model achieving the highest accuracy was selected.

Classification Model Adaptation & Finetuning:

The network was trained for 100 epochs for each of the new kits with a learning rate of 0.001. Within each epoch, we sample 30 episodes and set Q (number of samples per class) as 32 for each episode. The feature extractor was tuned with a learning rate of 0.0001. Adam optimizer was used for the network parameter update of both the feature extractor and the classifier. The inbuilt PyTorch image transformation functions were used, namely: 1) horizontal flip, 2) Random Rotation, 3) Color Jitter (including grayscale). Supplementary Table 4 shows the results from the test of robustness of the adapted model on the 4 new test kits using bootstrapping.

Classification Model Training from Scratch:

Similar to the initialization step before self-supervision, a ResNet18 CNN is used as the feature extractor which has been trained with the ImageNet1K dataset as a fully-supervised image classification task. The network is then trained on the training images of the new assay kit with Adam optimizer and a learning rate of 0.001. The same transformation functions used for the adaptation were used here.

Threshold Determination and Ambiguity Region

In general, the thresholds ($\delta_{neg}$, $\delta_{pos}$) for negative class and positive class were determined individually by feeding the detection score (probability of positive, $P_{pos}$) of all images of each class into the statistical model and fitting separately. Using the threshold determination of positive class as an example, the steps are explained below:

1) Select the Inverse Gaussian Distribution as the model template to be fitted (References 49, 50). The reasons why we select this one-side distribution model are,
   a. The inverse gaussian distribution is used to model variables of non-negative values.
   b. Since the probability output from the model is between 0 and 1, the inverse gaussian distribution is selected as it is tighter within the range [0,1] (i.e., the area under its probability density function (PDF) curve within [0,1] is closer to one), compared to other distribution models such as Gamma distribution which may have an observable tail in [1, infinity) interval.
2) Feed the $P_{pos}$ of all labelled positive zone images into the statistical model and use the fitted parameters to draw the PDF curve.
3) We set the area under the probability distribution curve (between the threshold and the extreme value, i.e., 1 for positive and 0 for negative) as 95% and use Divide and Conquer to find the corresponding threshold value 8, which is threshold for positive class $\delta_{pos}$.

For a negative class, $P_{pos}$ is still used as input to find the classification score threshold $\delta_{neg}$. For the convenience of presentation, [$\delta_{neg}$, $\delta_{pos}$] is used to denote the ambiguity region where images with $\delta_{neg} \leq P_{pos} \leq \delta_{pos}$ will not be classified since they fall within the region, and the images with $P_{pos} \leq \delta_{neg}$ or $P_{pos} \geq \delta_{pos}$ are classified as negative or positive respectively. The ratio of the unclassified images with respect to the entire evaluation set is reported as the percentage of ambiguous cases (as shown in Table 3).

Detailed Descriptions of Figures for Example 1

FIGS. 2A-2D. Overview of use case, challenge, and pipeline for image processing and machine learning. (FIG. 2A) Envisioned testing process for end user. The user takes an image of the assay kit using a smartphone displaying an on-screen image guide. The zones containing the bands are automatically identified, and a model that was pre-trained on a base kit (shown as "B" in the network) and previously rapidly adapted to a new kit (using few-shot learning, shown as "N" in the network) processes the images of zones. The model classifies each zone as positive or negative, and provides an overall assay result on the screen of the smartphone. The cloud-hosted model processes the image and generates the results in ~4 seconds. (FIG. 2B) Images of a base LFA kit (EcoTest) for pre-training the model, and five new COVID-19 LFA kits (including both antigen and antibody tests) to be interpreted. (FIG. 2C) Images illustrating the challenge for few-shot learning. A pre-trained model on the base kit, without adaptation, produces failed predictions on the new kits. Shown are both false positives and false negatives (likely due to variations in colors and intensities of membrane background and bands). (FIG. 2D) Overview of AutoAdapt LFA pipeline. From a raw input image of an assay kit, a correction of orientation and perspective is applied to segment an image of an assay kit. From the assay kit image, a segmentation model based on Mask R-CNN is used to extract the membrane region of interest (RoI). Based on measured kit-specific parameters, individual zones are cropped, and passed through a software pipeline consisting of a feature extractor followed by a binary classifier. Classification of each zone allows, via a kit-specific lookup table, for a final classification of assay result ("kit-level" classification or result) as positive, negative, or invalid.

FIGS. 3A-3B. Self-supervision and few-shot adaptation for LFA kits. (FIG. 3A) The feature extractor is pretrained on the base kit using self-supervised learning task over edge-filtered patterns and fully-supervised binary classification task. For each zone, fully-supervised binary classification is carried out with cross-entropy loss with the annotated binary labels (other loss calculations may be used). Sobel filter is used to highlight the edge pixels between the band and the background of the membrane. The edge image after normalization is used as ground truth and the learning process is used to reconstruct an image that resembles the ground truth edge image, with the quality measured in a calculated loss, e.g., MSE (Mean Square Error). The solid and dashed arrows indicate forward processing and gradient backpropagation respectively during the learning process. (FIG. 3B) Model adaptation is carried out by supervised contrastive learning to regularize the feature extractor and fully-supervised learning to learn an adapted classifier for the new kit. A sampling strategy to build an episode with Q (e.g., 32) images per class is used: for each class (positive or negative), given K (e.g., 10) new kit images available, P (e.g., 4) images are subsampled from the new kit and mixed with Q-P images of the base kit.

FIGS. 4A-4D. Zone-level and kit-level classification accuracies for four new COVID-19 LFA kits shown with ablated models and number of new kit training images. Ablation studies were carried out to analyze the relative contributions of self-supervised learning for feature extraction and supervised contrastive learning for adaptation. Each model was evaluated by varying the number of images used in the adaptation. Zone-level accuracy scores (left) and kit-level accuracy scores (right) reported for four new assay kits, (FIG. 4A) Flowflex, (FIG. 4B) DeepBlue, (FIG. 4C) Jinwofu and (FIG. 4D) ACON IgG/IgM. (The EcoTest housing 2 kit was identical in all aspects to the base kit expect for the housing, so the direct application of the base model without any adaptation was able to achieve 100% zone-level and kit-level accuracies.) The maximum accuracy indicates the upper bound attained by training a model from scratch using all training images for each kit.

Figure 5:
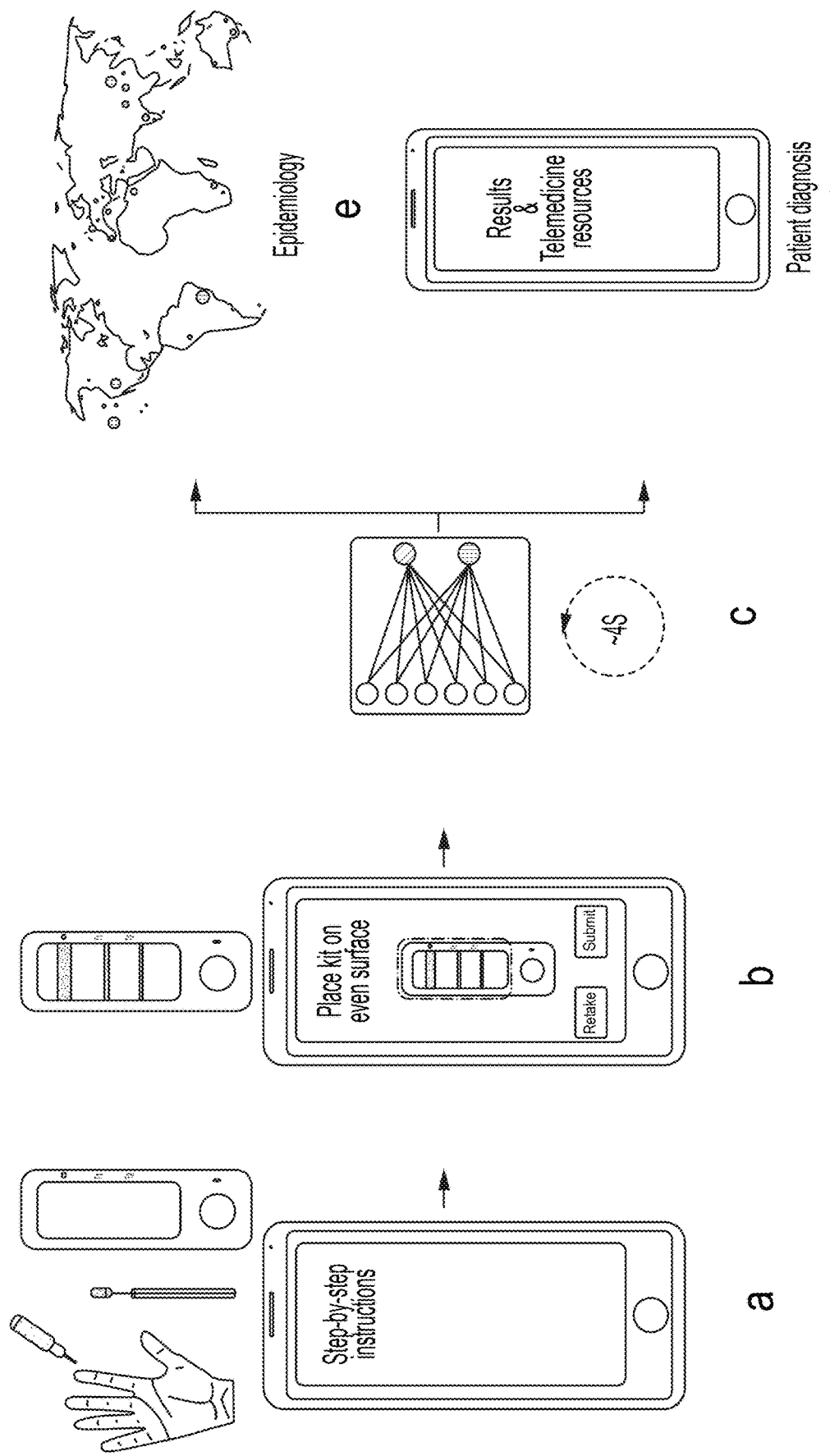
FIG. 5 illustrates a potential role of an example embodiment within a broader digital platform for supporting rapid testing in decentralized settings.

FIG. 5. Potential role of AutoAdapt LFA within a broader digital platform for supporting rapid testing in decentralized settings. (a) Step-by-step instructions to carry out the test. (b) App guided image capture. (c) Image preprocessing and deep-learning based classification. (d) Results displayed on user's phone and link to resources (sharing, saving, linkage-to-care). Automatically interpreted test results can also be used with telemedicine consultation. (e) Test results with demographic data stored on cloud server for real-time surveillance and modeling. (Created with BioRender.com)

Figure 6:
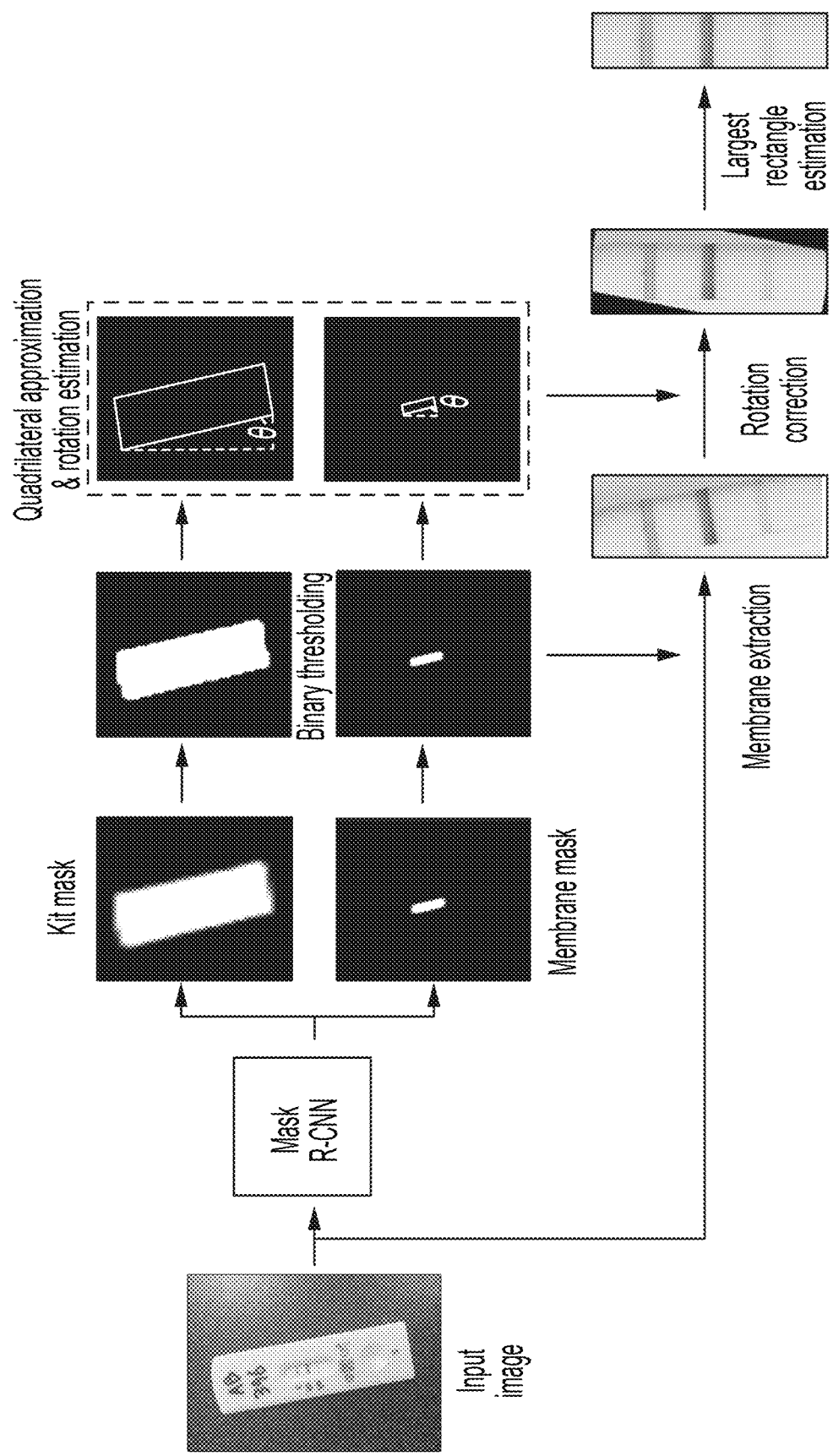
FIG. 6 illustrates an example workflow for membrane extraction and rotation correction.

FIG. 6. Workflow for membrane extraction and rotation correction. The assay kit image is passed through the instance segmentation model Mask R-CNN. The kit and membrane segmentation masks are obtained and binarized. The kit or the membrane mask is used for quadrilateral approximation and rotation estimation in the image, and the membrane mask is used to extract the membrane from the input image. The estimated rotation value is used to correct the perspective of the extracted membrane. Largest rectangle estimation is carried out to remove the black pixels in the rotation-corrected membrane to retain only the relevant pixels.

FIG. 7. Illustration of different IoU scores for membrane segmentation. Images shown are of the EcoTest (base kit) with the membrane segmentation mask overlaid on the zoomed-in image of the membrane. For each membrane image, segmentation masks corresponding to different IoU scores are shown with the score listed below the image.

Tables for Example 1

TABLE 1

| Kit name | IOU score |
| --- | --- |
| Flowflex | 0.92 |
| DeepBlue | 0.89 |
| Jinwofu | 0.90 |
| ACON IgG/IgM | 0.93 |
| EcoTest housing 2 | 0.93 |

Table 1. Intersection over Union scores for membrane segmentation. The IOU scores for each of the new kit images was obtained by selecting ten images at random from a labelled pool of 30 images for training and evaluating the performance on a fixed evaluation set of ten images.

TABLE 2

| Kit name | Without adaptation Zone accuracy (%) | Without adaptation Kit accuracy (%) | With adaptation Zone accuracy (%) | With adaptation Kit accuracy (%) |
| --- | --- | --- | --- | --- |
| EcoTest (base) | 98.8 | 96.5 | — | — |
| Flowflex | 93.1 | 86.1 | 99.8 | 99.6 |
| DeepBlue | 93.2 | 86.4 | 99.5 | 98.9 |
| Jinwofu | 94.7 | 89.4 | 100 | 100 |
| ACON IgG/IgM | 91.0 | 73.6 | 98.8 | 96.4 |
| EcoTest housing 2 | 100 | 100 | — | — |

Table 2. Zone-level and kit-level classification accuracy without adaptation (direct testing) and with adaptation. For the direct testing case, the model pretrained on the base kit was directly applied on each of the new kit's evaluation dataset. For the adaptation approach, the pretrained model was adapted to each of the new kits, except for EcoTest housing 2 kit, using 10-shot adaptation (20 zone images) and the performance on their respective evaluation datasets is listed here.

TABLE 3 a) EcoTest (base kit)

| Prediction | Label Positive | Label Negative |
| --- | --- | --- |
| Positive | (TP) 165 | (FP) 1 |
| Negative | (FN) 3 | (TN) 137 |

Table 3. Confusion matrices of the best models applied on the evaluation dataset (left) Accuracy and the percentage of ambiguous kits across varying ambiguity regions (right) (a) is the confusion matrix for the base model on base kit evaluation set. The performance of the best performing adapted model on the evaluation dataset for each of the new kits (b-e) without the enforcement of an ambiguity region is shown in the tables to the left. (f) shows the confusion matrix for the EcoTest housing 2 kit. The tables on the right show the accuracy for the corresponding assay kit and percentage of kits classified as ambiguous values for the different kits when varying the ambiguity region.

SUPPLEMENTARY TABLE 1

| Kit name | Designation | No. of zones per kit | Kit aspect ratio | Membrane aspect ratio | Zone aspect ratio |
| --- | --- | --- | --- | --- | --- |
| EcoTest | Base | 3 | 0.29 | 0.21 | 3.23 |
| Flowflex | New | 2 | 0.28 | 0.22 | 2.94 |
| DeepBlue | New | 2 | 0.28 | 0.19 | 2.17 |
| Jinwofu | New | 2 | 0.30 | 0.21 | 3.03 |
| ACON IgG/IgM | New | 3 | 0.28 | 0.21 | 2.86 |
| EcoTest housing 2 | New | 3 | 0.53 | 0.21 | 3.13 |

Supplementary Table 1. Assay kit parameters. Summary of manually measured parameters for each of the assay kits.

SUPPLEMENTARY TABLE 2

| | Flowflex Zone | Flowflex Mem. | DeepBlue Zone | DeepBlue Mem. | Jinwofu Zone | Jinwofu Mem. | ACON IgG/IgM Zone | ACON IgG/IgM Mem. | EcoTest housing 2 Zone | EcoTest housing 2 Mem. |
| --- | --- | --- | --- | --- | --- | --- | --- | --- | --- | --- |
| Positive class (train) | 149 | 50 | 125 | 25 | 146 | 50 | 182 | 63 | 20 | 5 |
| Negative class (train) | 51 | 50 | 75 | 75 | 54 | 50 | 118 | 37 | 10 | 5 |
| Positive class (eval.) | 305 | 83 | 244 | 60 | 164 | 60 | 386 | 126 | 66 | 21 |
| Negative class (eval.) | 143 | 141 | 124 | 124 | 44 | 44 | 193 | 67 | 6 | 3 |

Supplementary Table 2. Dataset split of training and evaluation sets for 5 new kits. The train and evaluation dataset sizes in terms of cropped zone images and membranes for the five new assay kits.

SUPPLEMENTARY TABLE 3

| Kit name | IOU score |
| --- | --- |
| Flowflex | 0.92 ± 0.009 |
| DeepBlue | 0.91 ± 0.012 |
| Jinwofu | 0.91 ± 0.079 |
| ACON IgG/IgM | 0.92 ± 0.012 |

Supplementary Table 3. Mean IoU scores using bootstrapping. The mean IOU scores for each of the new kit images, except for the EcoTest housing 2, was obtained by carrying out bootstrap sampling and obtaining three resamples. Each sample had ten randomly chosen images from a labelled pool of 30 images for training and the performance was evaluated on a fixed evaluation set of ten images. Due to a limitation on the available images only a single sampling was used for the EcoTest housing 2. Data is represented as mean±standard deviation.

SUPPLEMENTARY TABLE 4

| Kit name | Zone accuracy (%) | Kit accuracy (%) |
| --- | --- | --- |
| Flowflex | 99.6 ± 0.2 | 99.3 ± 0.3 |
| DeepBlue | 99.3 ± 0.2 | 98.6 ± 0.4 |
| Jinwofu | 99.6 ± 0.4 | 99.2 ± 0.7 |
| ACON IgG/IgM | 98.4 ± 0.5 | 95.3 ± 1.3 |

Supplementary Table 4. Mean classification accuracy scores using bootstrapping. The mean accuracy values were determined by carrying out 20 trials of bootstrap sampling with 10-shot adaptation (20 zone images) on the new kit's training dataset and evaluating the performance on the evaluation dataset. Data is represented as mean±standard deviation.

II. EXAMPLE 2

Example 2 is another example framework for a system and method of automated interpretation of test kits incorporating both self-supervised learning and few-shot adaptation. In self-supervised learning, as in Example 1, self-supervised edge-enhanced image reconstruction and fully-supervised image classification are used to train the feature extractor. This framework for pretraining using a self-supervision process is illustrated in FIG. 3A and described above. In Example 2, as in Example 1, after self-supervised learning, few-shot adaptation is then implemented to learn a good initialization of prototypes for classification for a novel rapid test kit. In Example 2, few-shot adaptation is done using a meta-learning pipeline, described in more detail below.

An example application of embodiments of the invention disclosed herein involves performing a novel pre-training process followed by few-shot learning, e.g., a meta-training process, with the OraQuick® HIV rapid test kits and then adapting the model to be used with the novel rapid test kits. In one example embodiment, the model is trained with 1,145 images of the OraQuick® test kits. With the introduction of a new test kit, collection of a sufficient number of images to retrain the model from scratch can inhibit rapid integration with the pipeline. Thus, a scanning algorithm as disclosed herein is able to adapt to such an unseen test kit with a minimal number of training images. The OraQuick®-trained model is able to adapt to a novel test kit after applying a few-shot adaptation process with a minimal number of training examples of the novel test kit. The OraQuick® test kit is composed of two detection zones (a control zone and a test zone), and the OraQuick®-trained model can be effectively adapted to novel test kits that have, for example, three distinct zones. The model has the capability to generalize to test kits with different geometry as well as a different number of detection zones. This capability can be accomplished with limited training (support) samples of the novel test kit and verified on a subset of test (query) samples of the novel test kit.

The capability extends to the ability to substantially avoid false negatives, as may otherwise sometimes occur, e.g., with low zone image pattern intensity. The capability also extends to the ability to substantially avoid false positives, as may otherwise sometimes occur, e.g., with high background color/intensity.

Pre-Training of a Feature Extractor Using Self-Supervised Learning

In accordance with certain embodiments of the invention, a robust feature extractor may be pre-trained using a novel self-supervision task, i.e., a novel self-supervised edge-enhanced image reconstruction task, as described above in connection with Example 1 and FIG. 3A. This self-supervised learning is used during model pre-training to improve the generality of the feature extractor. If used in conjunction with a few-shot learning process as described herein (such as supervised contrastive learning or meta-learning as described herein), the feature extractor pre-trained in this manner can improve the prediction accuracy for new target test kits.

As described above in connection with Example 1 and FIG. 3A, during pre-training, the network is trained to reconstruct the corresponding edge-enhanced image given an input image. This task is self-supervised since the labels for network training are generated automatically from the input images. In detail, using an input zone in the RGB format from the images of the source (or base) test kit (e.g., the OraQuick® test kit), the model first converts the RGB image into a grayscale image. The model then performs edge filtering to highlight the edge areas, i.e., pixels at the junction between the membrane background and a colored mark (e.g., line or dot) in the zone. An example embodiment of the invention disclosed herein involves using Sobel filtering as the edge filter. Another example embodiment of the invention disclosed herein involves using Laplacian filtering as the edge filter. Each edge-enhanced image processed by edge filtering is normalized to between 0 and 1 (if an edge exists), with the darkest pixel of the edge-enhanced image set as 0 and the lightest pixel of the edge-enhanced image set as 1. The normalized image is set as ground truth, i.e., for use as a label for loss computation in pre-training.

During this self-supervision task, the feature extractor (e.g., ResNet) generates feature-extracted images from the inputted RGB images, and the model feeds the extracted features of the RGB input image from the feature extractor into a decoder (e.g., a stack of deconvolution layers) to reconstruct the edge-enhanced image. The model uses the Mean Squared Error (MSE) between the decoder output (the reconstructed image) and the ground truth as the loss (other loss terms may be used).

As described above in connection with Example 1 and FIG. 3A, during pre-training, in addition to self-supervised pre-training, classification network learning may also be conducted by using images from the source test kit. For each zone, in addition to the extracted features being fed into the decoder to reconstruct the edge-enhanced image (as described above), the extracted features are also separately fed into a binary classifier for predicting the zone class (positive or negative). The images from the source test kit are annotated with binary labels (positive or negative), and the model uses the loss from the classification for pre-training (e.g., cross-entropy (CE) loss) in addition to the loss from the self-supervised learning (e.g., Mean Squared Error (MSE)) as described above. The feature extractor, the classifier, and the decoder are trained jointly in order to learn a good feature representation which is sensitive to the edges. Such learned features are trained to optimize the zone classification accuracy as well as the edge patterns at the same time. This self-supervised learning method is particularly effective for recognizing zone images that are of faint colors and thus hard to recognize even by naked eyes.

For the OraQuick® test kit as the base kit, the labeled samples are sufficient so that both the classification task and the edge-enhanced image reconstruction task may be conducted to learn a good feature extractor. Thus, as shown in FIG. 3A, output features of each cropped zone are sent into both the classifier (illustrated in FIG. 3A as the top output) and the decoder (illustrated in FIG. 3A as the bottom output). Given the manually annotated labels of each zone, the classifier is trained to learn specific prototypes associated with the positive and negative classes. Different from the classifier, the decoder may be a stack of deconvolution layers and the ground truth for its task is generated automatically, using the method described above (i.e., given a zone image in RGB format, convert it to grayscale image, and then apply an edge filter, e.g., a Sobel filter, to highlight the pixels in the edge region, i.e., pixels at the junction between the membrane background and the colored zone). Given the automatically generated edge-enhanced images as labels, the decoder is trained to learn the optimal weights used in the deconvolution layers. With the annotated classification label and the self-generated edge detection label, both the cross-entropy (CE) loss and the mean-squared-error (MSE) may be used as the objective, and gradient back-propagation may be performed for parameter updating. In this way, the extracted features are sensitive to the edge region and then the encoded edge information is used for classification. By using the edge-enhanced features, the feature extractor can generalize well on new test kit samples even if the image pattern (band/bar or dot) is faint.

Learning a New Classifier for a New Test Kit Using Few-Shot Adaptation

A second part of an example image recognition model, which may be used in conjunction with the pre-training of a robust feature extractor using self-supervised learning as described above, or independently therefrom with other pre-training, involves applying a few-shot adaptation process to learn a new classifier for the new rapid test kit. An example few-shot adaptation process uses meta-learning, and an example of this process employs an episode training strategy to learn a good classifier initialization, which can be adapted to the novel (target) rapid test kit with a small number of labelled samples. General meta-learning processes are known (see, e.g., Finn, Chelsea, et al., "Model-agnostic meta-learning for fast adaptation of deep networks," arXiv preprint arXiv:1703.03400 (2017)); the specific meta-learning process as disclosed and applied herein is believed to be novel.

The classifier used in classifying the target test kit images is based on prototypes, the weights for both positive and negative classes used in the fully connected network for binary classification. Traditionally, classifier prototypes are initialized with random values and then updated from training data of the specific rapid test kits. However, the prototypes cannot be learned properly when labeled examples from the new rapid test kit are limited. Even though the network learned on the base (existing or source) kits can be directly used as a starting point for training on novel (new or target) kits, the performance by finetuning (fix the feature extractor and update the parameters of the classifier with a small learning rate) on the novel kit samples may not be satisfactory. As such, as one example solution, the learned feature extractor parameters are fixed and a meta-learning strategy is employed to learn a good value set used for classifier initialization, with which the prototypes for the novel kit classification in the final system can be obtained by training on a small number of novel kit samples.

Figure 8:
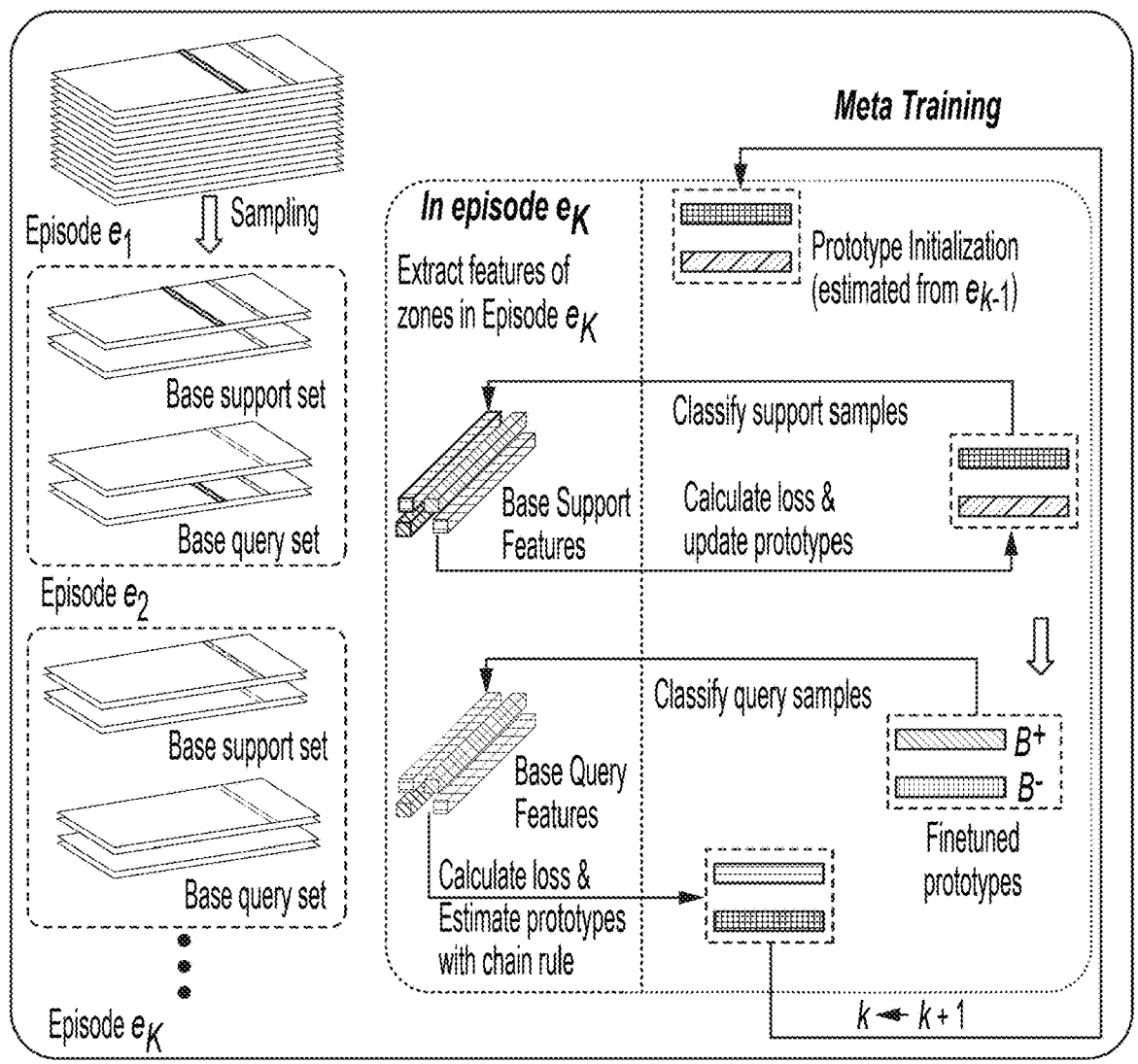
FIG. 8 illustrates steps of an example meta-learning process in accordance with some embodiments of the disclosure.
Figure 8:
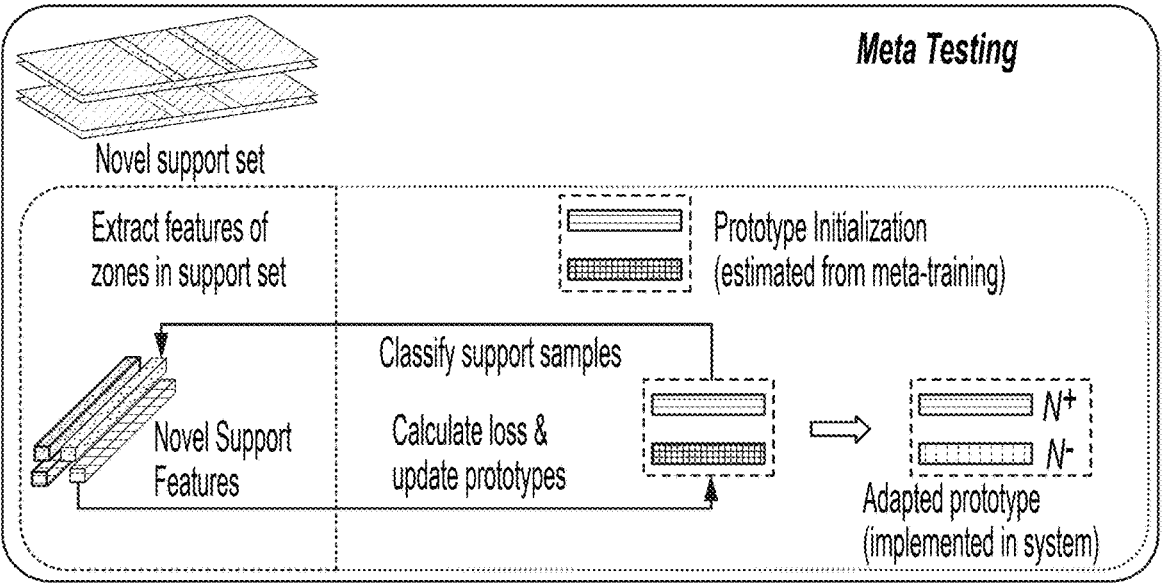

FIG. 8 illustrates an example of the meta-learning system and method. The meta-learning process includes meta-training followed by meta-testing. In meta-training, the initialization value is learned by performing meta-training on the base kit (e.g., OraQuick®) samples. Then, in meta-testing, the learned value is directly used as the initialization point for the adaptation on the novel kit samples. In meta-training, an episodic training strategy may be used. In detail, in the first episode, the initialization values are randomly generated and then updated using the back-propagation process with the chain rule in the first episode. Then, the updated initialization is used as the starting point of the process during the next episode. In this way, the initialization value is updated iteratively in all episodes one by one. During meta-training, one episode is constructed by randomly selecting a fixed number of samples from all base kit samples. In detail, K samples for each class are randomly sampled to build a base support set and another randomly selected M samples (e.g., 15 samples) for each class are used to build a base query set.

During each succeeding episode in meta-training, the episode starts with a classifier with the prototype initialization values estimated from the previous episode. This classifier is first used to classify samples in the base support set and to update the classifier prototypes (typically after multiple epochs). Then this updated classifier is used to classify samples from the base query set and, at this time, the chain rule is used to estimate new prototype initialization values for the classifier. Such initialization values are used to start the update process in the next episode. After meta-training, in meta-testing an adapted classifier for the novel kit is obtained. In detail, the initialization value set learned from the last meta-training episode is used as the initialization, and the network is trained on the few novel kit samples in a novel support set to get an updated network for novel kit adaptation. The updated network after meta-testing is the network implemented in the final system.

Notably, in traditional finetuning, the prototypes parameters are updated directly on a few novel samples after a large number of epochs, which may overfit to the novel samples used for finetuning. In contrast, in the meta-training process disclosed herein, the same few-shot environment as the environment in novel kit adaptation is simulated and used to simulate one few-shot learning task in each episode. In each episode, the base support set is used to update the classifier prototypes for quick adaptation and the classification loss over the base query set is used to estimate new initialization values of the prototype. The difference between different tasks is induced by the different samples used as the base support set and the base query set. In this way, the episodic training strategy is used to obtain a good network initialization that can be quickly adapted to a new environment with only a few novel samples while avoiding overfitting issues associated with traditional finetuning.

To improve the performance further, two values (i.e., scale and shift) are introduced for each convolution kernel included in the feature extractor. They are learned following the same process as that used for learning the initialization values for classifier porotypes during the meta-training stage.

III. FLOW CHARTS, FURTHER EMBODIMENTS, AND ADVANTAGES

Figure 9:
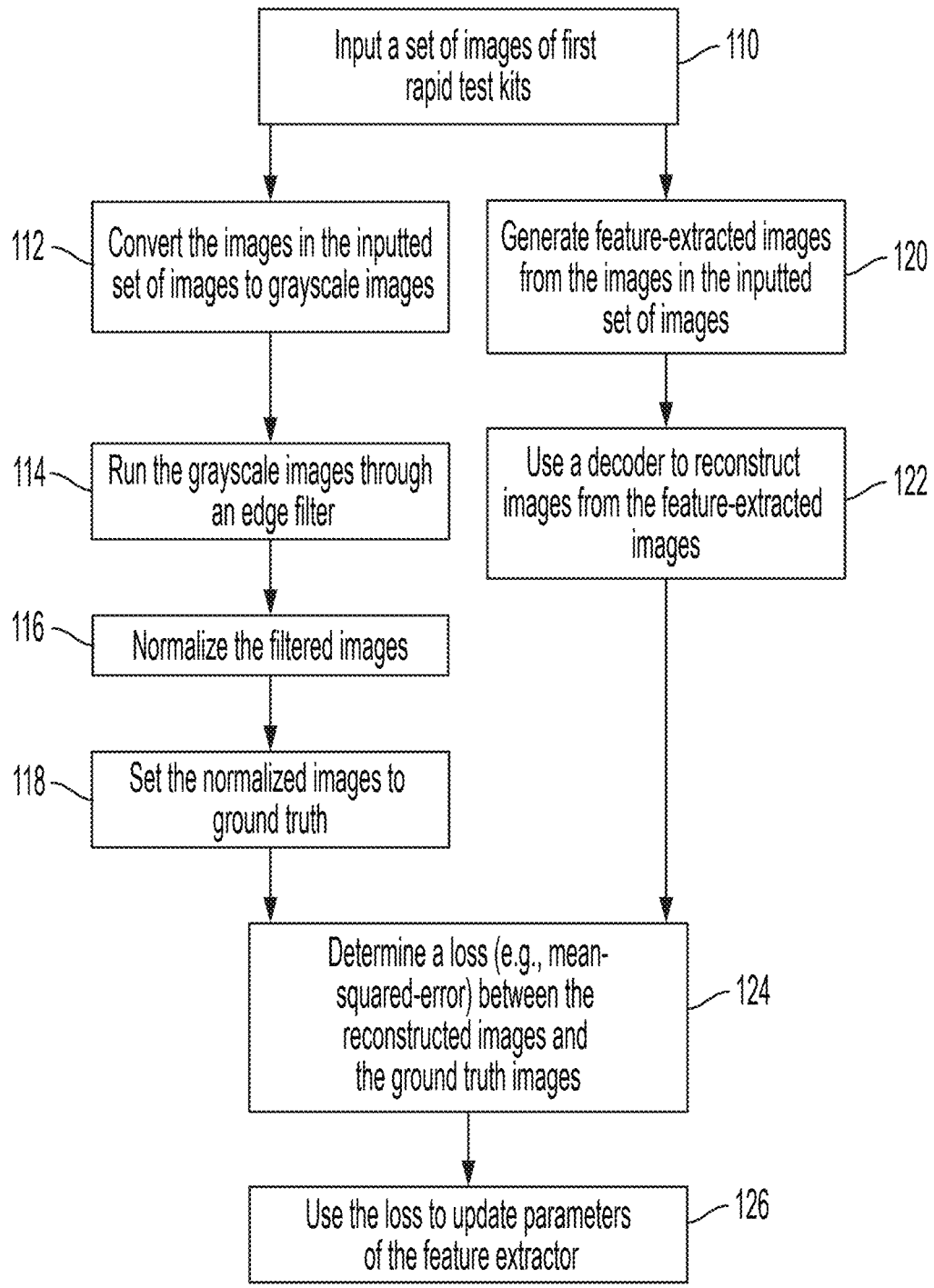
FIG. 9 shows a flow chart of steps for an example method of pre-training a feature extractor using self-supervised learning.

FIG. 9 shows a flow chart of steps for an example method of pre-training a feature extractor using self-supervised learning. Step 110 comprises inputting a set of images of first rapid test kits. Step 112 comprises converting the images in the inputted set of images to grayscale images. Step 114 comprises running the grayscale images through an edge filter. Step 116 comprises normalizing the filtered images. Step 118 comprises setting the normalized images to ground truth. Step 120 comprises generating feature-extracted images from the images in the inputted set of images. Step 122 comprises using a decoder to reconstruct images from the feature-extracted images. Step 124 comprises determining a loss (e.g., mean-squared-error) between the reconstructed images and the ground truth images. Step 126 comprises using the loss (e.g., mean-squared error) to update parameters of the feature extractor.

Figure 10:
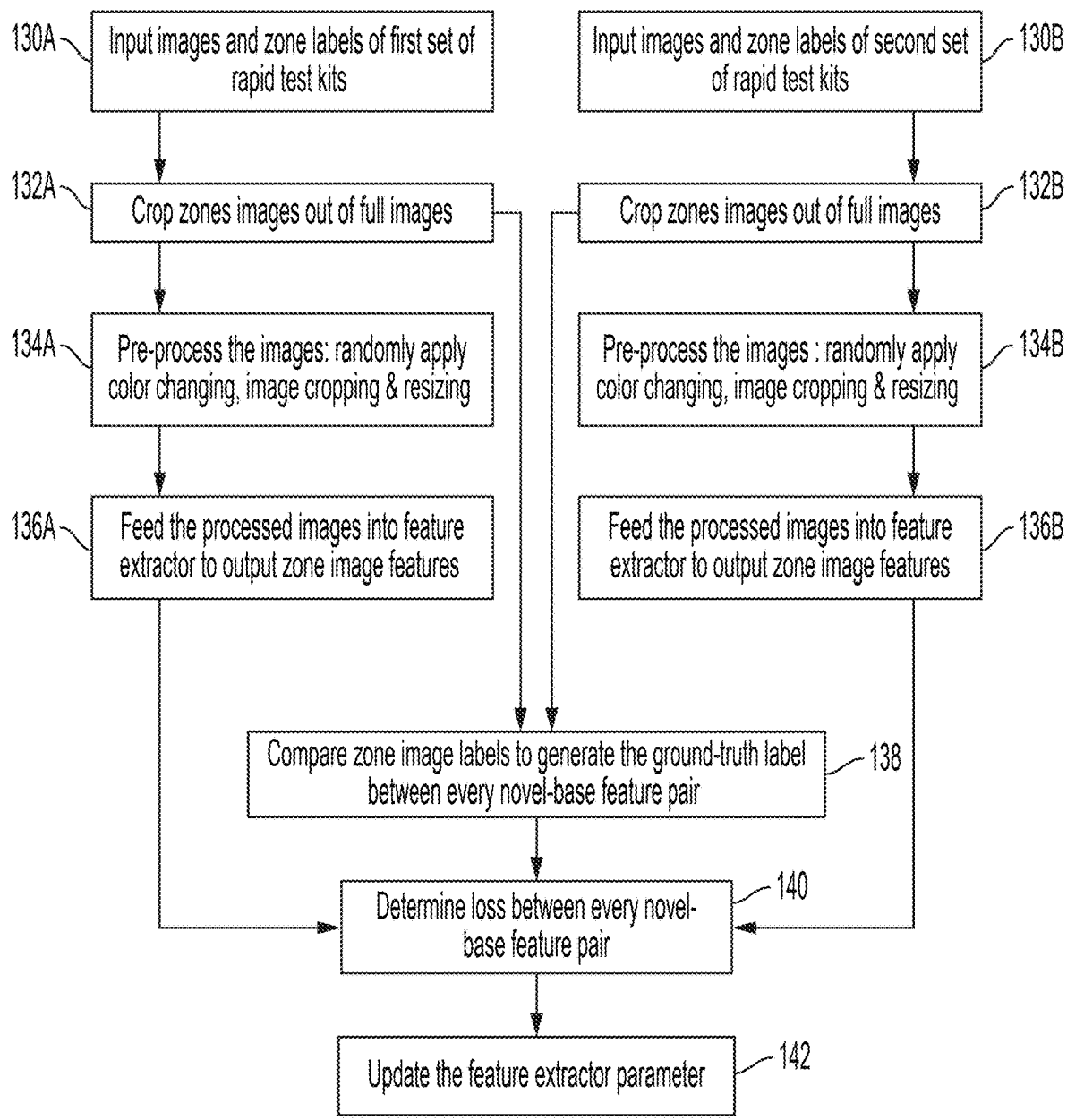
FIG. 10 shows a flow chart of steps for an example method of few-shot adaptation using supervised contrastive learning.

FIG. 10 shows a flow chart of steps for an example method of few-shot adaptation using supervised contrastive learning. Step 130A comprises inputting images and zone labels of a first set of rapid test kits (e.g., base test kits). Step 130B comprises inputting images and zone labels of a second set of rapid test kits (e.g., novel test kits). Steps 132A and 132B comprise cropping zone images out of full images of the first and second rapid test kits, respectively. Steps 134A and 134B comprise pre-processing the zone images (randomly applying color changing, image cropping, and resizing) of the first and second rapid test kits, respectively. Steps 136A and 136B comprise feeding the processed images of the first and second rapid test kits, respectively, into the feature extractor to output zone image features. Step 138 comprises comparing zone image labels to generate the ground-truth label between every novel-base feature pair. Step 140 comprises determining loss between every novel-base feature pair. Step 142 comprises updating the feature extractor parameter.

Figure 11:
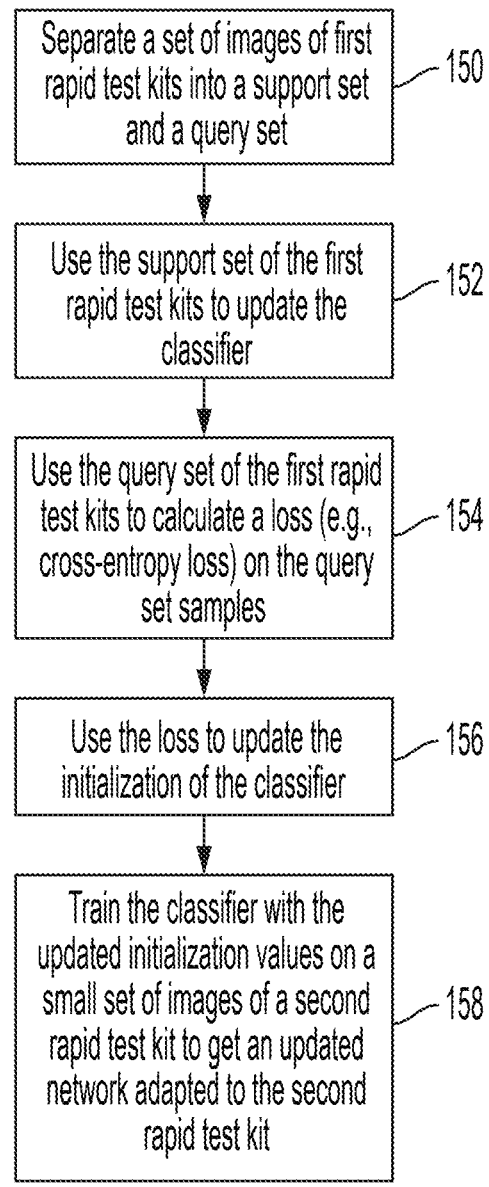
FIG. 11 shows a flow chart of steps for an example method of few-shot adaptation using meta-learning.

FIG. 11 shows a flow chart of steps for an example method of few-shot adaptation using meta-learning. Step 150 comprises separating a set of images of first rapid test kits (e.g., base test kits) into a support set and a query set. Step 152 comprises using the support set of the first rapid test kits to update the classifier. Step 154 comprises using the query set of the first rapid test kits to calculate a loss (e.g., cross-entropy loss) on the query set samples. Step 156 comprises using the loss to update the initialization of the classifier. Step 158 comprises training the classifier with the updated initialization values on a small set of images of a second rapid test kit (e.g., novel test kits) to get an updated network adapted to the second rapid test kit.

Persons having ordinary skill in the art will appreciate that embodiments of the inventions detailed here make it possible to rapidly learn a deep learning model for a new test kit with very few training samples and challenging cases, thus facilitating rapid deployment of accurate models for new rapid test kits. The number of samples of the novel (target) test kit used in a few-shot learning system and method as described herein may be substantially fewer than the number of samples of the existing (base) test kit used in the system and method. For example, in some embodiments the number of novel image samples may be any number within the range of 1 to 5, any number within the range of 6 to 10, any number within the range of 10 to 20, or greater. In some embodiments, the ratio of existing image samples to novel image samples may be, for example, 5:1, greater than 5:1, 20:1, greater than 20:1, 30:1, greater than 30:1, 50:1, or greater than 50:1.

It is believed that the use of self-supervised learning to reconstruct edge-enhanced images has not been done before. It is also believed that its combination with a few-shot adaptation process as described herein is also novel. A robust feature extractor is important for handling challenging images in rapid test kits like those with faint zones. The application of a few-shot adaptation process with self-supervised learning has not been done in this format for the interpretation of rapid test kit images.

Embodiments of systems and methods as disclosed herein may comprise or be implemented with computer components including one or more processors, one or more non-transitory computer-readable media, and/or one or more programs. The neural networks or components thereof may be implemented in software, hardware, or a combination of software and hardware. Various components described herein that may be implemented in a neural network (e.g., feature extractor, classifier, and/or decoder) may be implemented together in a single neural network or over multiple neural networks. Components described herein that may be implemented in a neural network or multiple neural networks may reside in a location or the cloud that can communicate with remote devices, such as user smart phones. For example, user smart phones may run applications that facilitate capturing and sending images of test kits to the separate location or the cloud, and results from the separate location or the cloud may be returned to the user smart phones. In other embodiments, components described herein that may be implemented in a neural network or multiple neural networks may reside on the user smart phones.

Systems and methods as disclosed herein enable generalization to new kits using limited validated images. The systems and methods may be implemented across a range of test kits with different visual detectable signals (bands, dots, and other shapes with various sizes and colors) for diagnosis of a range of conditions and diseases. Features of different examples disclosed herein may be combined to create additional example systems and methods in accordance with the principles of the disclosure.

Persons of ordinary skill in the art will appreciate that the implementations of the invention encompassed by the disclosure are not limited to the particular examples described above. Although illustrative implementations have been shown and described, a wide range of modification, change, and substitution is contemplated in the foregoing disclosure. It is understood that such variations may be made to the foregoing without departing from the scope of the disclosure. Accordingly, it is appropriate that the appended claims be construed broadly, consistent with the disclosure.

REFERENCES

1. Posthuma-Trumpie, G. A., Korf, J., van Amerongen, A. J. A. & chemistry, b. Lateral flow (immuno) assay: its strengths, weaknesses, opportunities and threats. A literature survey. 393, 569-582 (2009).
2. Andryukov, B. G. J. A. M. Six decades of lateral flow immunoassay: from determining metabolic markers to diagnosing COVID-19. 6, 280-304 (2020).
3 Ibitoye, M., Frasca, T., Giguere, R., Carballo-Diéguez, A. J. A. & Behavior. Home testing past, present and future: lessons learned and implications for HIV home tests. 18, 933-949 (2014).
4. Koczula, K. M. & Gallotta, A. Lateral flow assays. Essays in biochemistry 60, 111-120 (2016).
5. Carrio, A., Sampedro, C., Sanchez-Lopez, J. L., Pimienta, M. & Campoy, P. Automated low-cost smartphone-based lateral flow saliva test reader for drugs-of-abuse detection. Sensors-Basel 15, 29569-29593 (2015).
6. Ghani, A. C., Burgess, D. H., Reynolds, A. & Rousseau, C. Expanding the role of diagnostic and prognostic tools for infectious diseases in resource-poor settings. Nature 528, S50-52, doi: 10.1038/nature16038 (2015).

7. FDA. In Vitro Diagnostics EUAs-Antigen Diagnostic Tests for SARS-COV-2, <https://www.fda.gov/medical-devices/coronavirus-disease-2019-covid-19-emergency-use-authorizations-medical-devices/in-vitro-diagnostics-euas-antigen-diagnostic-tests-sars-cov-2> (2021).
8. Ballard, Z. S. et al. Deep learning-enabled point-of-care sensing using multiplexed paper-based sensors. 3, 1-8 (2020).
9 Joung, H.-A. et al. Point-of-care serodiagnostic test for early-stage lyme disease using a multiplexed paper-based immunoassay and machine learning. 14, 229-240 (2019).
10. Contreras-Naranjo, J. C., Wei, Q. & Ozcan, A. J. I. J. o. S. T. i. Q. E. Mobile phone-based microscopy, sensing, and diagnostics. 22, 1-14 (2015).
11. Kong, J. E. et al. Highly Stable and Sensitive Nucleic Acid Amplification and Cell-Phone-Based Readout. Acs Nano 11, 2934-2943, doi: 10.1021/acsnano.6b08274 (2017).
12. Potluri, V. et al. An inexpensive smartphone-based device for point-of-care ovulation testing. 19, 59-67 (2019).
13. Shah, K. G., Singh, V., Kauffman, P. C., Abe, K. & Yager, P. J. A. c. Mobile phone ratiometric imaging enables highly sensitive fluorescence lateral flow immunoassays without external optical filters. 90, 6967-6974 (2018).
14. Dell, N. & Borriello, G. in Proceedings of the 3rd ACM Symposium on Computing for Development. 1-10.
15. Ruppert, C., Phogat, N., Laufer, S., Kohl, M. & Deigner, H.-P. J. M. A. A smartphone readout system for gold nanoparticle-based lateral flow assays: application to monitoring of digoxigenin. 186, 119 (2019).
16. Dell, N. L., Venkatachalam, S., Stevens, D., Yager, P. & Borriello, G. in Proceedings of the 5th ACM workshop on Networked systems for developing regions. 3-8.
17. Draz, M. S. et al. Virus detection using nanoparticles and deep neural network-enabled smartphone system. Sci Adv 6, doi: 10.1126/sciadv.abd5354 (2020).
18. Balán, I. C. et al. SMARTtest: A Smartphone App to Facilitate HIV and Syphilis Self- and Partner-Testing, Interpretation of Results, and Linkage to Care. AIDS and Behavior, 1-14 (2019).
19. Aveyard, J., Mehrabi, M., Cossins, A., Braven, H. & Wilson, R. J. C. c. One step visual detection of PCR products with gold nanoparticles and a nucleic acid lateral flow (NALF) device. 4251-4253 (2007).
20. Parolo, C. et al. Tutorial: design and fabrication of nanoparticle-based lateral-flow immunoassays. 15, 3788-3816 (2020).
21. Millipore, E. J. E. M. C. B., MA, USA. Rapid lateral flow test strips: Considerations for product development. 29, 702-707 (2013).
22. Yetisen, A. K., Akram, M. S. & Lowe, C. R. Paper-based microfluidic point-of-care diagnostic devices. Lab Chip 13, 2210-2251, doi: 10.1039/c3lc50169h (2013).
23. Huang, X. & El-Sayed, M. A. J. J. o. a. r. Gold nanoparticles: Optical properties and implementations in cancer diagnosis and photothermal therapy. 1, 13-28 (2010).
24. Lake, B. M., Salakhutdinov, R. & Tenenbaum, J. B. J. S. Human-level concept learning through probabilistic program induction. 350, 1332-1338 (2015).
25. Wang, Y., Yao, Q., Kwok, J. T. & Ni, L. M. J. A. C. S. Generalizing from a few examples: A survey on few-shot learning. 53, 1-34 (2020).
26. Wu, Y. & Demiris, Y. in 2010 IEEE International Conference on Robotics and Automation. 2889-2894 (IEEE).
27. Snell, J., Swersky, K. & Zemel, R. in Advances in neural information processing systems. 4077-4087.
28. Kang, B. et al. in Proceedings of the IEEE International Conference on Computer Vision. 8420-8429.
29. Wang, Y.-X., Ramanan, D. & Hebert, M. in Proceedings of the IEEE International Conference on Computer Vision. 9925-9934.
30. Sun, Q., Liu, Y., Chua, T.-S. & Schiele, B. in Proceedings of the IEEE conference on computer vision and pattern recognition. 403-412.
31. Wang, Y.-X. & Hebert, M. in European Conference on Computer Vision. 616-634 (Springer).
32. Sajid, M., Kawde, A.-N. & Daud, M. J. J. o. S. C. S. Designs, formats and applications of lateral flow assay: A literature review. 19, 689-705 (2015).
33. Bahadır, E. B. & Sezgintürk, M. K. J. T. T. i. A. C. Lateral flow assays: Principles, designs and labels. 82, 286-306 (2016).
34. Budd, J. et al. Digital technologies in the public-health response to COVID-19. Nat Med 26, 1183-1192, doi: 10.1038/s41591-020-1011-4 (2020).
35. Wood, C. S. et al. Taking connected mobile-health diagnostics of infectious diseases to the field. Nature 566, 467-474, doi: 10.1038/s41586-019-0956-2 (2019).
36. Whitelaw, S., Mamas, M. A., Topol, E. & Van Spall, H. G. J. T. L. D. H. Applications of digital technology in COVID-19 pandemic planning and response. (2020).
37. Murray, C. J., Alamro, N. M. S., Hwang, H. & Lee, U. J. T. L. P. H. Digital public health and COVID-19. 5, e469-e470 (2020).
38. Kittler, J. J. I. & Computing, V. On the accuracy of the Sobel edge detector. 1, 37-42 (1983).
39. He, K., Gkioxari, G., Dollar, P. & Girshick, R. Mask R-CNN. IEEE Trans Pattern Anal Mach Intell 42, 386-397, doi: 10.1109/TPAMI.2018.2844175 (2020).
40. Khosla, P. et al. Supervised contrastive learning. (2020).
41. Kingma, D. P. & Welling, M. J. a. p. a. Auto-encoding variational bayes. (2013).
42. Wan, Z., Zhang, Y. & He, H. in 2017 IEEE symposium series on computational intelligence (SSCI). 1-7 (IEEE).
43. McAulay, K. et al. Retrospective clinical evaluation of 4 lateral flow assays for the detection of SARS-COV-2 IgG. 98, 115161 (2020).
44. Ren, S., He, K., Girshick, R. & Sun, J. Faster R-CNN: Towards Real-Time Object Detection with Region Proposal Networks. IEEE Trans Pattern Anal Mach Intell 39, 1137-1149, doi: 10.1109/TPAMI.2016.2577031 (2017).
45. Girshick, R. in Proceedings of the IEEE international conference on computer vision. 1440-1448.
46. Minaee, S. et al. Image segmentation using deep learning: A survey. (2021).
47. Geetha Kiran, A. & Murali, S. J. J. C. S. A. Automatic rectification of perspective distortion from a single image using plane homography. 3, 47-58 (2013).
48. Deng, J. et al. in 2009 IEEE conference on computer vision and pattern recognition. 248-255 (Ieee).
49. Folks, J. L. & Chhikara, R. S. J. J. o. t. R. S. S. S. B. The inverse Gaussian distribution and its statistical application—a review. 40, 263-275 (1978).
50. Chhikara, R. The inverse Gaussian distribution: theory: methodology, and applications. Vol. 95 (CRC Press, 1988).

What is claimed is:

1. A system for automated image interpretation of rapid test kits, wherein the system comprises:
a neural network;
wherein the neural network comprises a feature extractor;
wherein the feature extractor has been pre-trained using self-supervised learning with a set of images of first rapid test kits;
wherein the neural network has been adapted to a second rapid test kit that is a different type of test kit than the first rapid test kits;
wherein the self-supervised learning by which the feature extractor has been pre-trained comprises:
inputting the set of images of first rapid test kits;
converting the images in the inputted set of images to grayscale images;
running the grayscale images through an edge filter, normalizing the filtered images, and setting the normalized images to ground truth;
generating feature-extracted images from the images in the inputted set of images;
using a decoder to reconstruct images from the feature-extracted images;
determining a first calculated loss between the reconstructed images and the ground truth images; and
using the first calculated loss to update parameters of the feature extractor; and
wherein in addition to the set of images of first rapid test kits, the feature extractor has also been pre-trained with a synthetic dataset mixed with the set of images of first rapid test kits, wherein the synthetic dataset comprises partially-formed indicia.

2. The system for automated image interpretation of rapid test kits as in claim 1, wherein the feature extractor also has been pre-trained by:
using a classifier to classify the feature-extracted images;
determining a second calculated loss between the classified images and labels for the images in the inputted set of images; and
using the second calculated loss to update parameters of the feature extractor.

3. The system for automated image interpretation of rapid test kits as in claim 1, wherein the neural network further comprises a classifier.

4. The system for automated image interpretation of rapid test kits as in claim 3, wherein the neural network has been adapted to the second rapid test kit using a few-shot adaptation process comprising supervised contrastive learning.

5. The system for automated image interpretation of rapid test kits as in claim 3, wherein the neural network has been adapted to the second rapid test kit using a few-shot adaptation process comprising a meta-learning technique, wherein the meta-learning comprises:
(i) a meta-training step comprising:
separating a set of images of the first rapid test kits into a support set and a query set;
using the support set of the first rapid test kits to update a classifier;
using the query set of the first rapid test kits to calculate a loss on the query set samples; and
using the loss to update the initialization of the classifier; and
(ii) a meta-testing step comprising training the classifier with the updated initialization values on a set of images of the second rapid test kits to get an updated network adapted to the second rapid test kit, wherein the number of images in the set of images of the second rapid test kits is smaller than the number of images in the set of images of the first rapid test kits.

6. The system for automated image interpretation of rapid test kits as in claim 1, wherein the system comprises software that is implemented on a user's smart phone, wherein the software uses a gyroscope of the user's smart phone to get a test kit image into a correct orientation.

7. The system for automated image interpretation of rapid test kits as in claim 6, wherein the system comprises a deep neural network for instance segmentation to detect kit and membrane boundaries.

8. The system for automated image interpretation of rapid test kits as in claim 6, wherein the system is adapted to extract individual zones from each kit using kit dimensions provided by a kit manufacturer.

9. A system for automated image interpretation of rapid test kits, wherein the system comprises:
a neural network;
wherein the neural network comprises a feature extractor;
wherein the feature extractor has been pre-trained using self-supervised learning with a set of images of first rapid test kits;
wherein the neural network has been adapted to a second rapid test kit that is a different type of test kit than the first rapid test kits;
wherein the neural network further comprises a classifier; and
wherein the number of images in the set of images of the second rapid test kits is at most 20.

10. A system for automated image interpretation of rapid test kits, wherein the system comprises:
a neural network;
wherein the neural network comprises a feature extractor;
wherein the feature extractor has been pre-trained using self-supervised learning with a set of images of first rapid test kits;
wherein the neural network has been adapted to a second rapid test kit that is a different type of test kit than the first rapid test kits;
wherein the neural network further comprises a classifier; and
wherein the ratio of the number of images in the set of images of the first rapid test kits to the number of images in the set of images of the second rapid test kits is 5:1 or greater.

11. A method for automated image interpretation of rapid test kits, wherein the method comprises:
providing a neural network comprising a feature extractor;
pre-training the feature extractor using self-supervised learning with a set of images of first rapid test kits; and
adapting the neural network to a second rapid test kit that is a different type of test kit than the first rapid test kits;
wherein the pre-training of the feature extractor using self-supervised learning with the set of images of first rapid test kits comprises:
inputting the set of images of first rapid test kits;
converting the images in the inputted set of images to grayscale images;
running the grayscale images through an edge filter, normalizing the filtered images, and setting the normalized images to ground truth;
generating feature-extracted images from the images in the inputted set of images;
using a decoder to reconstruct images from the feature-extracted images;

determining a first calculated loss between the reconstructed images and the ground truth images; and using the first calculated loss to update parameters of the feature extractor;

wherein the method further comprises generating a synthetic dataset comprising partially-formed indicia, mixing the synthetic dataset with the set of images of first rapid test kits, and using the synthetic dataset mixed with the set of images of first rapid test kits to pre-train the feature extractor.

12. The method for automated image interpretation of rapid test kits as in claim 5, further comprising pre-training the feature extractor by:

using a classifier to classify the feature-extracted images;

determining a second calculated loss between the classified images and labels for the images in the inputted set of images; and using the second calculated loss to update parameters of the feature extractor.

13. The method for automated image interpretation of rapid test kits as in claim 11, wherein the neural network further comprises a classifier.

\* \* \* \* \*